United States Patent
Kwak et al.

(10) Patent No.: US 11,659,564 B2
(45) Date of Patent: May 23, 2023

(54) RADIO CONTROL CHANNEL RESOURCE SET DESIGN

(71) Applicant: Apple Inc., Cupertino, CA (US)

(72) Inventors: Yongjun Kwak, Portland, OR (US); Honglei Miao, Munich (DE); Debdeep Chatterjee, San Jose, CA (US); Gang Xiong, Portland, OR (US); Hong He, Sunnyvale, CA (US); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/477,475

(22) PCT Filed: May 4, 2018

(86) PCT No.: PCT/US2018/031120
§ 371 (c)(1),
(2) Date: Jul. 11, 2019

(87) PCT Pub. No.: WO2018/204806
PCT Pub. Date: Nov. 8, 2018

(65) Prior Publication Data
US 2019/0357185 A1    Nov. 21, 2019

Related U.S. Application Data

(60) Provisional application No. 62/567,158, filed on Oct. 2, 2017, provisional application No. 62/501,883, filed on May 5, 2017.

(51) Int. Cl.
*H04W 72/04* (2009.01)
*H04W 72/23* (2023.01)

(52) U.S. Cl.
CPC .................. *H04W 72/23* (2023.01)

(58) Field of Classification Search
CPC .................................................. H04W 72/042
(Continued)

(56) References Cited

U.S. PATENT DOCUMENTS 9,179,325 B2 *  11/2015  Yuan .................... H04L 5/0051
2013/0028108 A1   1/2013  Wu et al.
(Continued)

FOREIGN PATENT DOCUMENTS

CN   106537964 A    3/2017
WO   2018/204806 A1  11/2018

OTHER PUBLICATIONS

Discussion and evaluation on NR-PBCH design; 3GPP R1-1705708; Spokane, USA, Apr. 3-7, 2017.*
(Continued)

*Primary Examiner* — Faisal Choudhury
(74) *Attorney, Agent, or Firm* — Eschweiler & Potashnik, LLC

(57) ABSTRACT

Embodiments herein may relate to transmission, in a first physical channel transmission, of an indication of a first set of parameters related to a control channel; and transmission, in a control channel transmission using the first set of parameters, of an indication of a second set of parameters related to the control channel. Further embodiments may relate to identifying a first parameter related to interleaving REGBs of a PDCCH transmission, wherein the first parameter is selected from a first plurality of parameters; interleaving the REGBs based on the first parameter to form a CCE; and transmitting the CCE in the PDCCH transmission. Other embodiments may be described and/or claimed.

43 Claims, 16 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2014/0314007 | A1 | 10/2014 | Chen et al. | |
| 2015/0189640 | A1* | 7/2015 | Lee ........................ | H04L 5/0053 370/329 |
| 2015/0223149 | A1 | 8/2015 | Liu et al. | |
| 2016/0013910 | A1* | 1/2016 | Ji ............................ | H04L 5/006 370/329 |
| 2018/0098361 | A1* | 4/2018 | Ji ........................ | H04W 74/0866 |
| 2018/0192383 | A1* | 7/2018 | Nam ................... | H04W 72/044 |
| 2018/0324843 | A1* | 11/2018 | Lee ........................ | H04W 48/04 |
| 2019/0215095 | A1* | 7/2019 | Park ..................... | H04W 72/042 |
| 2019/0380113 | A1* | 12/2019 | Shin ....................... | H04L 1/0072 |
| 2020/0021419 | A1* | 1/2020 | Taherzadeh Boroujeni ................ | H04L 5/0091 |
| 2020/0128585 | A1* | 4/2020 | Kuang ................... | H04L 5/0094 |
| 2020/0187236 | A1* | 6/2020 | Moon ................... | H04L 5/0044 |
| 2020/0367242 | A1* | 11/2020 | Moon ............... | H04W 72/0453 |

OTHER PUBLICATIONS

US-provisional-application U.S. Appl. No. 62/442,237 20170104.*
Ericsson, "NR Delivery of remaining system information," R1-1706012, 3GPP TSG RAN WG1 Meeting #88bis, Spokane, USA, Mar. 25, 2017. See pp. 1-4.
Ericsson, "On CORESETs," R1-1706753, 3GPP TSG RAN WG1 Meeting #88bis, Spokone, USA, Apr. 9, 2017. See pp. 2-4.
Huawei, et al., "Discussion on NR-PDCCH Structure," R1-1704204, 3GPP TSG RAN WG1 Meeting #88bis, Spokane, USA, Mar. 25, 2017. See Sections 1-2.
NTT Docomo, Inc., "Discussion on remaining system information delivery in NR," R1-1705709, 3GPP TSG RAN WG1 Meeting #88bis, Spokane, USA, Mar. 25, 2017. See Sections 1-2.
PCT Sep. 10, 2018 International Search Report and Written Opinion of the International Search Authority from International Application No. PCT/US2018/031120.
Supplementary European Search Report dated Dec. 16, 2020 for European Patent Application EP 18794948.
Panasonic: "Configuration of Corse I and Search Space Design"; 3GPP Draft; R1-1705175; vol. Ran WG1; Apr. 2, 2017; http://www.3gpp.org/ftp/Meetings_3GPP_SYNC/RAN1/Docs/.
Panasonic: "Relation Among NR-PBCH, SIBs and Subcells"; 3GPP Draft; R1-1702760; vol. Ran WG1; Feb. 12, 2017; http://www.3gpp.org/ftp/Meetings_3GPP_SYNC/RAN1/Docs/.
NTT Docomo, Inc., R1-1705708 "Discussion and evaluation on NR-PBCH design"; 3GPP tsg_ran\WG1_RL1, TSGR1_88; Mar. 25, 2017.
NTT Docomo, Inc., R1-1705709 "Discussion on remaining system information delivery in NR" 3GPP tsg_ran\WG1_RL1,TSGR1_88b; Mar. 25, 2017.

* cited by examiner

RADIO CONTROL CHANNEL RESOURCE SET DESIGN

CROSS-REFERENCE TO RELATED APPLICATIONS

This application is a national stage application under 35 U.S.C. § 371 of PCT International Application Serial No. PCT/US2018/031120 filed on May 4, 2018 and entitled "NEW RADIO CONTROL CHANNEL RESOURCE SET DESIGN" which application claims the benefit of U.S. Provisional Application No. 62/501,883, filed May 5, 2017, and further claims the benefit of U.S. Provisional Application No. 62/567,158, filed Oct. 2, 2017, each of which is incorporated herein by reference in its entirety.

FIELD

Embodiments of the present disclosure generally relate to the field of cellular communications, and more specifically to control information in said communications.

BACKGROUND

Mobile communication has evolved significantly from early voice systems to today's highly sophisticated integrated communication platform. The next generation wireless communication system—which may be referred to as fifth generation (5G), new radio (NR), or some other term—may provide access to information and sharing of data anywhere, anytime by various users and applications NR is expected to be a unified network/system that may meet vastly different and sometimes conflicting performance dimensions and service requests. Such diverse multi-dimensional requirements may be driven by different services and applications. In general, NR may be similar to or derive aspects of the third generation partnership project (3GPP) long term evolution-advanced (LTE-A) technology, with additional potential new radio access technologies (RATs) to enrich people's lives with better, simple, and seamless wireless connectivity solutions.

In some NR networks, one or more control channel resource sets (which may be referred to as CORESETs), may be configured by the network and transmitted to a user equipment (UE). In order to support the transmission of the common channel, for example the transmission of system information on the common channel, a common CORESET may be configured for a UE. In addition, it may also be possible to configure a UE-specific CORESET for the transmission of UE-specific data channels.

In some other NR networks, an interleaver may be used to realize distributed transmission of a NR physical downlink control channel (NR-PDCCH). Each NR-PDCCH transmission may be comprised of one or more control channel elements (CCEs). Each CCE may be made of six resource element groups (REGs), each of which may include 12 consecutive subcarriers. To achieve better channel estimation performance, a number of adjacent REGs in time or frequency may form a REG bundle (REGB). For example, a REGB may include a number of adjacent REGs such as 2, 3, or 6 REGs that all have the same precoding applied. As a result, a CCE may include one or more REGBs. The number of REGBs in the CCE may depend, for example, on the size of the REGB. The CORESET may be made up of a plurality of one or more REGs, REGBs, or CCEs, dependent on the size of the CORESET. Time first or frequency first numbered REGBs in a CORESET may be sequentially fed into an interleaver, and the sequential REGBs at the output of the interleaver may be used to construct CCEs with consecutive logical indices. These CCEs may, as noted above, form the NR-PDCCH CORESET transmission.

DETAILED DESCRIPTION

Figure 1:
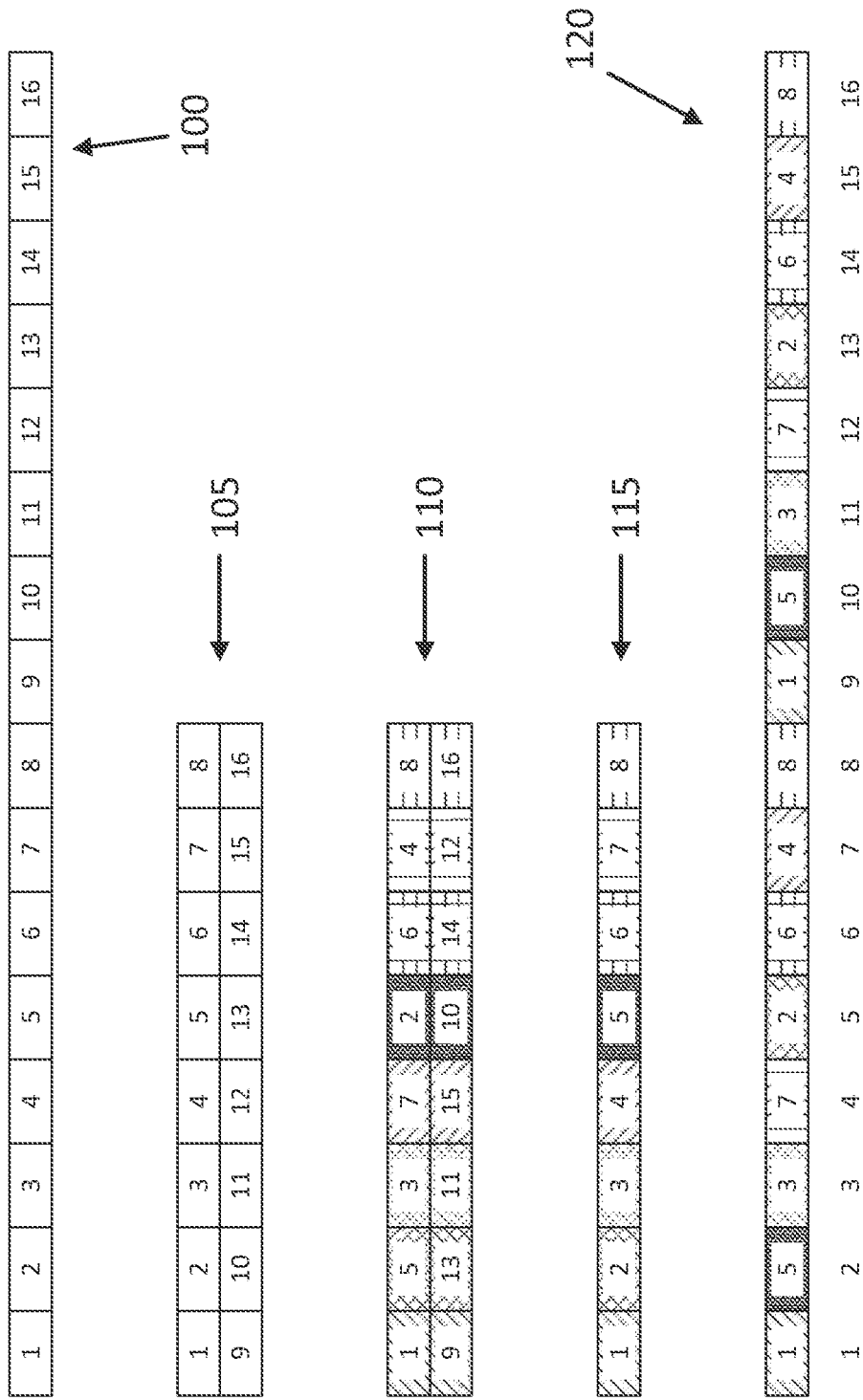
FIG. 1 illustrates an example CCE distribution over a CORESET using an interleaver, in accordance with various embodiments.

In the following detailed description, reference is made to the accompanying drawings which form a part hereof, wherein tike numerals designate tike parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A). (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

CORESET Configuration

As noted above, time first or frequency first numbered REGBs in the CORESET may be sequentially fed into an interleaver, and the sequential REGBs at the output of the interleaver may be used to construct CCEs with consecutive logical indices. The NR-PDCCH may then be constructed from the CCEs. A variety of different interleaving approaches may be used.

In a first approach (referred to as option Alt-1 herein), a long term evolution (LTE) PDCCH or enhanced PDCCH interleaver operating on one or more REGBs may be used. The interleaver may include two steps, i.e. a block interleaver followed by a column-permutation. Input data may be written row-by-row in ascending column order into the interleaving matrix, followed by a column-permutation of the interleaving matrix. The data may then be read out of the interleaving matrix column-by-column in ascending row order.

In a second approach (referred to as option Alt-2 herein), a one-step block interleaver may be used. Compared to Alt-1, no column-permutation may be applied. Some variants of Alt-2 may depend on how the number of rows in the interleaving matrix are chosen. For example, in some embodiments the number of rows may be configurable, while in other embodiments the number of rows may depend on the REGB size.

In a third approach (referred to as option Alt-3 herein), two stages may be used In the first step, the interleaving may be within X REGBs where the interleaving unit is a REGB. The second interleaving may be within the CORESET where the interleaving unit is Y resource blocks (RBs). Similarly, some variants of Alt-3 may be possible depending on how the interleaving matrix is written or read, e.g., in a pseudo-random or regular manner as the block interleaving in Alt-1 or Alt-2.

The design targets of the interleaver may include achieved frequency diversity, randomization of CCEs as the output of the interleaver, and potential positive impact on blocking probability caused by multiple overlapped CORESETs configuration. However, the options Alt-1, Alt-2, or Alt-3 may have both pros and cons. Therefore, different ones of the interleaving options may be preferred due to various tradeoffs of the involved design targets.

Some embodiments herein may relate to a fully configurable interleaving method so that all of the different options may be realized by a particular parameterized configuration. As a result, the network may choose the preferred interleaving solution according to the intended design targets and system control resource configuration.

Embodiments herein may relate to a configurable interleaver. The interleaver may be appropriate, for example, for NR-PDCCH transmissions and particularly for distributed NR-PDDCH transmissions. The interleaver may include a number of configurable parameters. One such parameter may be the number of interleaver stages. For example, the interleaver may have one or more stages.

Another parameter may include, for a stage of the one or more stages, the interleaving unit in terms of number of REGBs. That is, for the stage, does the interleaver work on a single REGB or a plurality of REGBs. Other parameters may include, for a stage of the one or more stages, the number of rows or the number of columns in the interleaving matrix of die interleaver. Another parameter may include, for a stage of the one or more stages, a column-permutation pattern vector. The column-permutation pattern vector could be a function of a cell identifier (CID), a virtual cell identifier (VCID), a UE identifier (UE ID), or some other parameter.

These configurable settings may enable the interleaver to achieve the desired trade-off among frequency diversity, randomization of allocated CCEs. and potential blocking mitigation among multiple overlapped CORESET configurations In some embodiments, some of the configurable parameters may be a function of other parameters so that the set of free configurable parameters may be reduced. More specifically, the proposed configurable interleaver may incorporate various of the alternatives discussed above (Alt-1, Alt-2, Alt-3) into a unified framework so that the network can choose a particular interleaving method according to the exact context of the network configuration. This may allow the network to achieve a trade-off among relevant performance targets. In other words, the network may be able to configure the interleaver based on specific desired targets and goals, and adjust the interleaver as those targets/goals change.

Figure 2:
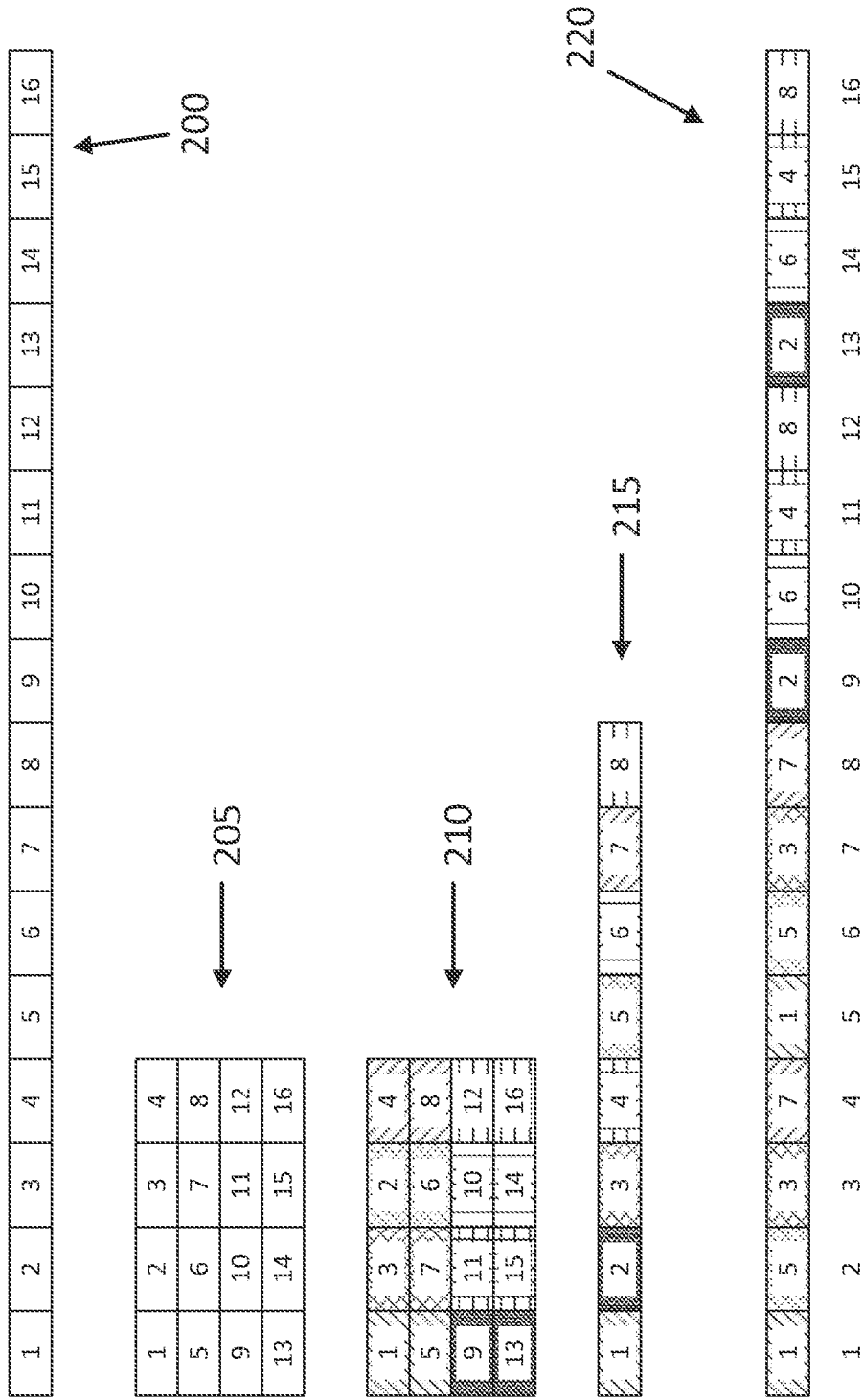
FIG. 2 illustrates an alternative example CCE distribution over a CORESET using an interleaver, in accordance with various embodiments.
Figure 3:
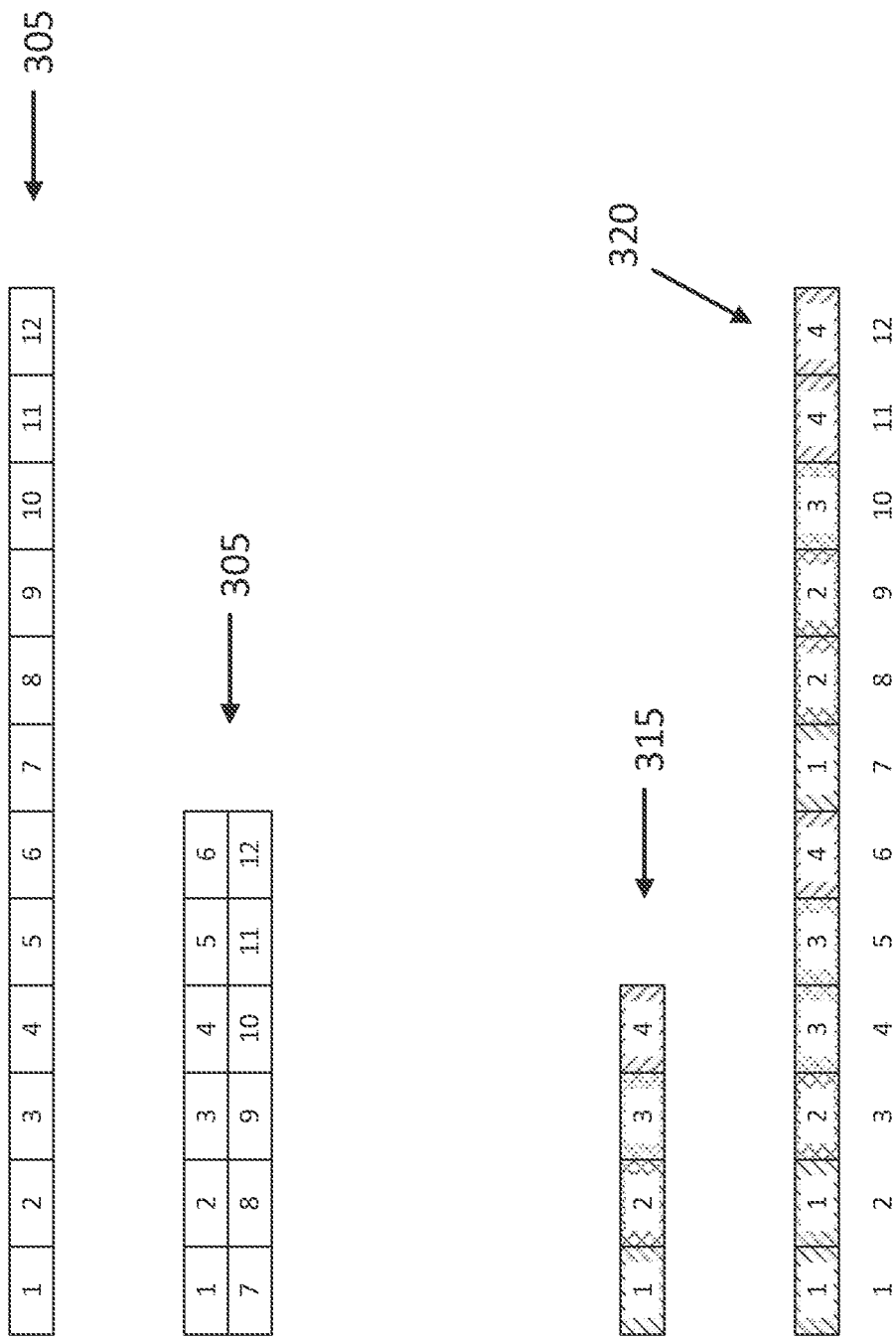
FIG. 3 illustrates an alternative example CCE distribution over a CORESET using an interleaver, in accordance with various embodiments.

FIGS. 1-3 depict various examples of CCE distribution over a CORESET using an interleaver, in accordance with various embodiments. In these embodiments, the configurable interleaver may include one or several sequential interleaving stages. The number of interleaving stages, N_I, may be configurable. The configurable interleaving stages may involve three stages. Specifically, in stage 1, a configurable rectangular interleaving matrix may be filled row-by-row in ascending column order. In stage 2, a configurable column-permutation operation is performed on the filled interleaving matrix In stage 3, the interleaving matrix is read column-by-column in ascending row order.

The following parameters may be configured in the nth interleaving stage, where n=1 ... N_I:
1. Interleaving unit in terms of the number of REGBs: B_n
2. The number of rows of the interleaving matrix: R_n
3. The number of columns of the interleaving matrix: C_n
4. The column-permutation function: c_p=f_n (c), wherein c=1, 2, ... C_n.

In some embodiments, not all of the above-described parameters may be used. For example, in some embodiments the column-permutation function c_p may not be used, or other of the parameters may not be used.

With the above-described configurable interleaver and parameters, different interleaver configurations may be realized In the following described embodiments, let X refer to the number of REGBs in the CORESET. Let Y refer to the number of REGBs per CCE.

FIG. 1 illustrates an example CCE distribution over a CORESET using an interleaver, in accordance with various embodiments. Specifically, in FIG. 1, N_I=1. B=1. R=Y, C=X/Y, f_1 may be some deterministic function of the CID, VCID, UE ID, or some other parameter. Specifically, in FIG. 1, X may be equal to 16 and Y may be equal to 2. Generally, FIG. 1 may depict the use of the configurable interleaver to perform the interleaving technique of Alt-1, as described above.

FIG. 1 depicts 16 REGB indices at 100, numbered 1-16. The indices may be organized in a 2×8 interleaving matrix at 105. Specifically, as can be seen, the REGBs may be written into the interleaver matrix at 105 row-by-row in ascending column order. A column-permutation on the interleaving matrix may be performed at 110. Specifically, c_p may be equal to [1, 5, 3, 7, 2, 6, 4, 8] wherein each entry defines the column index before column-permutation In this example, the 2nd column of the matrix after permutation shall be the 5th column of the matrix before the permutation. The CCE indices which correspond to the column index of the matrix alter column-permutation are depicted at 115. For example, the 5th CCE, i.e., the 5th column of the matrix which is the shaded column in 110 and 115 consists of REGBs #2 and #10. As a result, the allocation of the 5th CCE is shown in 120 wherein each index in each block denotes the CCE index and the numbers below each block stand for the REGB index as in UK).

As can be seen from FIG. 1, each CCE may be fully distributed over the CORESET. Moreover, the CCEs with consecutive indices may be evenly distributed over the CORESET, thereby simplifying the construction of high aggregation level NR-PDDCH transmissions that include several consecutive CCEs in a hierarchical search space.

FIG. 2 illustrates an example CCE distribution over a CORESET using an interleaver, in accordance with various embodiments. Specifically, in FIG. 2, N_I=1, B=1, R may be some preferred value (for example, 4 as shown in FIG. 2) C=X/R. f_1 may be some deterministic function of the CID, VCID, UE ID, or some other parameter. Specifically, in FIG. 2, X may be equal to 16 and Y may be equal to 2. Generally, FIG. 2 may depict the use of the configurable interleaver to perform the interleaving technique of Alt-2, as described above.

Similarly to FIG. 1, the REGB indices are depicted at 200. A 4×4 interleaving matrix is depicted at 205. The column-permutation, c_p, may be equal to [1, 3, 2, 4] and is depicted at 210. The CCE indices are depicted at 215. The CCE distribution in CORESET is depicted at 220.

As can be seen in FIG. 2, each CCE obtained from Alt-2 may only span in the half of the CORESET, and two CCEs with consecutive indices may be distributed in the whole CORESET. If the CCE is desired to be located in the half of the CORESET for the sake of reduced frequency distribution, the configuration of Alt-2 (and FIG. 2) may facilitate that result.

FIG. 3 illustrates an example CCE distribution over a CORESET using an interleaver, in accordance with various embodiments. Specifically, in FIG. 3, N_I=1, B=1, R=1, C=X/2. The column-permutation, c_p may not be used in this specific example. Specifically, in FIG. 3, X may be equal to 16 and Y may be equal to 3. Generally, FIG. 3 may depict the use of the configurable interleaver to perform the interleaving technique of Alt-3, as described above.

Similarly to FIG. 1, the REGB indices are depicted at 300. A 2×6 interleaving matrix is depicted at 305. The CCE indices are depicted at 315. The CCE distribution in CORESET is depicted at 320.

As can be seen in FIG. 3, when the number of rows in the interleaving matrix is smaller than the number of REGBs per CCE. i.e. Y, the resultant CCE may be less distributed over the CORESET, specifically it may be spanned in several segments of consecutive REGBs. However, this reduced distributed CCE allocation may potentially reduce the blocking probability of multiple overlapped CORESET configurations.

It will be understood that the embodiments described with respect to FIGS. 1-3 are intended as examples, and other embodiments may use one or more different parameters. For example, in other embodiments the interleaving matrix may be a different size, the number of stages may be different, the column-permutation may be different, the number of REGBs or CCEs may be different, etc.

Figure 4:
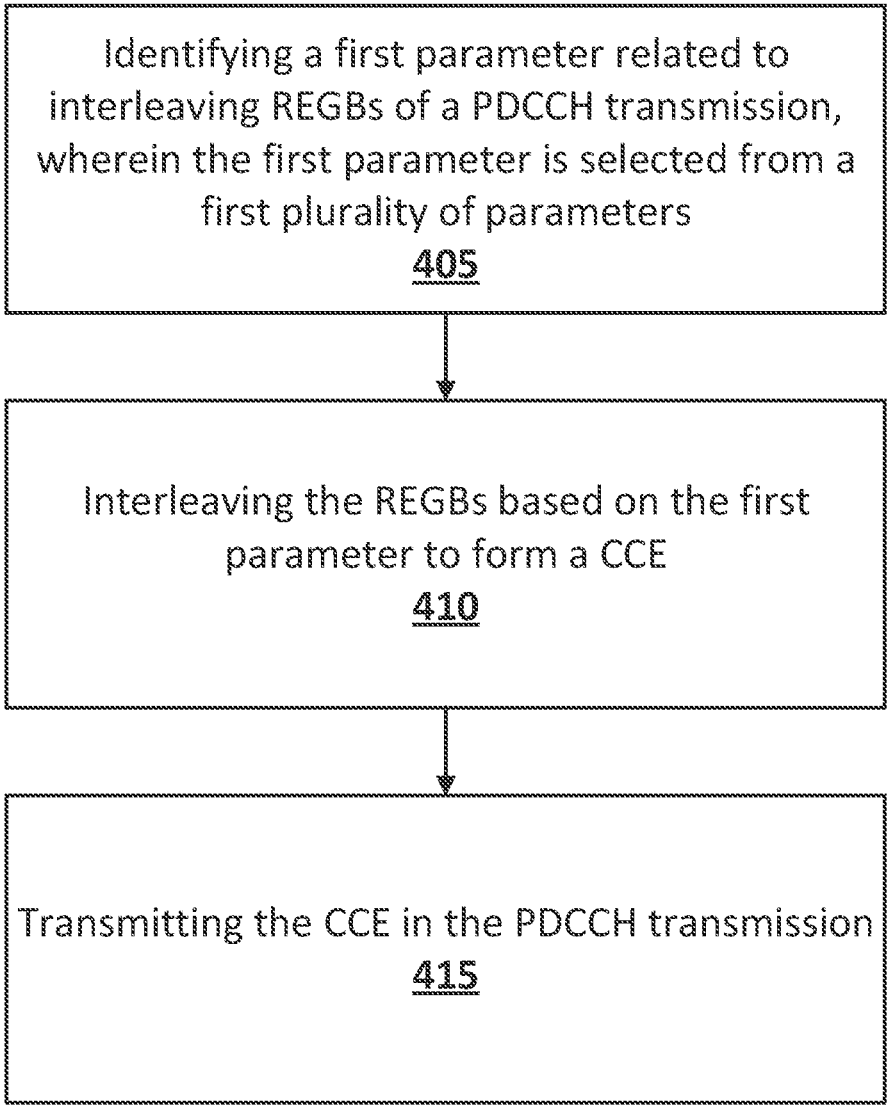
FIG. 4 illustrates an example technique for generating an interleaved PDCCH transmission, in accordance with various embodiments.

FIG. 4 illustrates an example technique for generating an interleaved PDCCH transmission, in accordance with various embodiments such as those described above with respect to FIGS. 1-3. The technique may include identifying, at 405, a first parameter related to interleaving REGBs of a PDCCH transmission. The parameter may be selected from a first plurality of parameters and may include, for example, the number of stages of the interleaver, the interleaving unit in terms of numbers of REGBs (for a given stage), the number of rows or columns of the interleaving matrix used by the interleaver or a stage of the interleaver, the column-permutation pattern, some other parameter, or some combination of the above.

The technique may further include interleaving the REGBs based on the identified first parameter to form a CCE at 410. Examples of said interleaving may be as described above with respect to FIGS. 1-3. The CCE may then be transmitted at 415 in a PDCCH transmission. Specifically, the CCE may be transmitted in an NR-PDCCH transmission. In some embodiments, the CCE may be transmitted as part of a CORESET. It will be understood that in some embodiments a plurality of CCEs may be formed at 410, and the plurality of CCEs may be transmitted at 415.

CORESET Transmission

As noted above, in some embodiments, for system information delivery, a common CORESET configuration may be used by the UE to receive system information correctly. Further embodiments herein may relate to mechanisms to configure a common CORESET for the reception of system information.

Specifically, as noted above, in some embodiments it may be desirable for a common CORESET to be configured for a UE for the delivery of NR system information. In embodiments. NR system information may be transmitted to a NR UE using three different channels. For example, in some embodiments the NR physical broadcast channel (NR-PBCH) may transmit essential minimum system information (EMSI). Subsequently, the NR-PDCCH or the NR physical downlink shared channel (NR-PDSCH) may transmit remaining minimum system information (RMSI). The NR-PDCCH or the NR-PDSCH may also transmit other system information (oSI).

Figure 5:
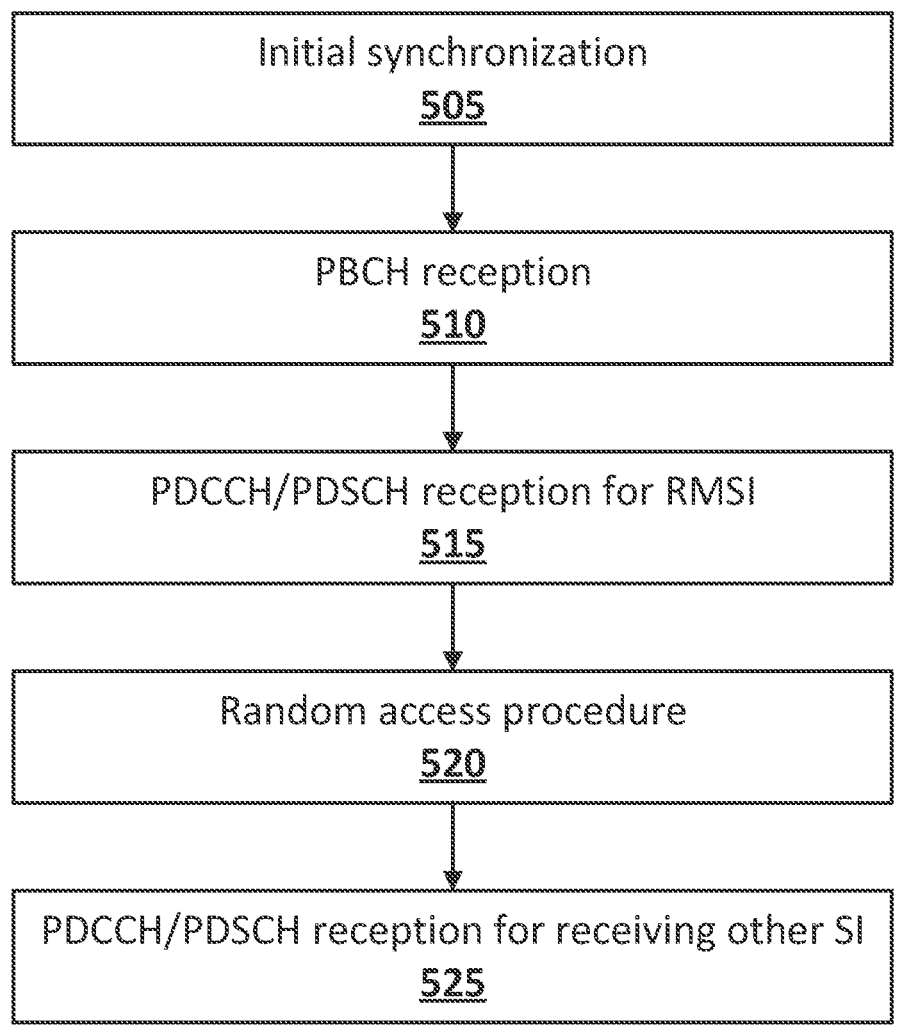
FIG. 5 illustrates an example initial access technique, in accordance with various embodiments.

FIG. 5 illustrates an example initial access technique, in accordance with various embodiments. When a UE starts initial access, it may first perform an initial synchronization at 505 by detecting synchronization signals. Such signals may be, for example, transmitted by a base station, an evolved NodeB (eNB), a radio access network (RAN) node, or some other transmitter. For easy of reference, this type of transmitter may be referred to herein as "base station" without loss of generality.

Subsequently, the UE may receive a NR-PBCH transmission at 510. The NR-PBCH transmission may include, for example, EMSI as described above. The NR-PBCH transmission may be transmitted by the same base station as the synchronization at 505, or a different base station.

The UE may then receive random access procedure configuration information from RMSI received in a NR-PDCCH or a NR-PDSCH transmission at 515. For a random access procedure, a random access response may be transmitted using NR-PDCCH inside a common CORESET, and scheduled NR-PDSCH so that the common CORESET may be configured. Once the common CORESET is configured, the UE may perform a random access procedure at 520. The random access procedure may include one or more of, for example, transmission of a random access preamble by the UE on the random access channel (RACH); transmission by a base station to a UE of a random access response (RAR); transmission by the UE of a Msg3 transmission such as a radio resource control (RRC) connection request or a UE identification message, and transmission by a base station to the UE of a Msg4 transmission such as a contention resolution message. In other embodiments, the random access procedure may include one or more additional transmissions or messages.

In some embodiments, the random access procedure may include the transmission of oSI. For example, the oSI may be transmitted by the base station as part of the RAR or the Msg4 transmission. In some embodiments, the oSI may be transmitted by the base station using a common search space in the common CORESET, or a UE-specific search space in the common CORESET. If the oSI is transmitted in an on-demand manner, it may also be transmitted by the base station using a UE-specific search space in the UE-specific CORESET.

After the UE performs the random access procedure at 520, the UE may then receive a NR-PDSCH transmission of a NR-PDCCH transmission at 525 to receive other system information blocks (SIBs), thereby ending the initial access procedure.

In some embodiments, the random access procedure at 520 may not be used only for initial access as described in FIG. 5. In other embodiments, the random access procedure at 520 may be used by a UE for other purposes such as uplink synchronization, handover, beam-pair link establishment, etc. Depending on the purpose of the random access procedure, the UE behavior may be changed. For example, only the RACH preamble transmission and the RAR may be needed for uplink synchronization.

For the reception of RMSI and oSI, it may be desirable for the UE to receive the NR-PDCCH transmission first, and then the NR-PDSCH transmission may be scheduled for the delivery of RMSI and oSI. Therefore, it may be desirable for the UE to know the common CORESET parameters for the reception of the NR-PDCCH or the NR-PDSCH transmission, and the common CORESET parameters may be contained with the NR-PBCH message at 510. However, the NR-PBCH may be a broadcast channel that is receivable by multiple UEs. Therefore, the NR-PBCH may need to be transmitted using a large power and a low code rate. Therefore, in some embodiments it may be undesirable to include too many information bits into the NR-PBCH. As the configuration of the common CORESET may require many information bits, it may be challenging to include all of the common CORESET parameters into the NR-PBCH transmission.

In one embodiments, a two-step CORESET configuration may be used. Specifically, in some embodiments, in order to receive the RMSI, the UE may be required to monitor the NR-PDCCH and receive the corresponding NR-PDSCH transmission. Therefore, for the reception of the NR-PDCCH transmission, it may be desirable for an NR-PBCH transmission to indicate which downlink resources the UE should monitor for the NR-PDCCH transmission. In order to reduce the configuration information included in the NR-PBCH, in some embodiments a subset of CORESET information, i.e., information that could be considered to be "essential configuration information" of the CORESET may be included in an NR-PBCH transmission. Remaining CORESET configuration information may be included in the RMSI itself.

Generally, the CORESET may include a variety of parameters including:

- Start position in frequency band or frequency gap or frequency offset between a synchronization signal (SS) block or NR-PBCH and common CORESET. In some design, the frequency offset may be equal to zero without the need of indication;
- A number of physical resource blocks (PRBs) (granularity can be CCE size) or CCEs in the CORESET;
- A number of Orthogonal Frequency Division Multiplex (OFDM) symbols in the CORESET;
- A frequency first mapping or time first mapping for REG to CCE mapping;
- A frequency first mapping or time first mapping for a CCE to NR-PDCCH candidate mapping;
- Whether the CORESET is distributed or localized;
- REGB size in the frequency domain. Alternatively or additionally, one default REGB size may be fixed and applied for a NR-PDCCH transmission in the common CORESET. The value also may be determined based on at least the configured resource size in terms of CCEs or resource blocks (RBs);
- The transmission scheme used for CORESET;
- The number of demodulation reference signal (DMRS) ports used to transmit the CORESET;
- A group-common NR-PDCCH configuration;
- A slot offset and periodicity of essential CORESET information;
- A slot duration (e.g., 7 or 14 symbols);
- Numerology for the NR-PDCCH transmission scheduling RMSI. Alternatively or additionally, the numerology of NR-PDCCH and the RMSI scheduled by NR-PDCCH can be assumed to be the same as that of NR-PBCH, and hence may not be explicitly signaled.
- A quasi co-location (QCL) indication;
- For the QCL, an indication of antenna ports or channels, e.g., whether the primary synchronization signal (PSS)/ secondary synchronization signal (SSS) is quasi colocated with the CORESET with respect to parameters like Doppler shift, Doppler spread, average delay, delay spread, etc.

In addition, some parameters related to a search space for the monitoring of an NR-PDCCH transmission (that may include scheduling RMSI) may include an indication of aggregation level and an indication of the number of aggregation levels for NR-PDCCH monitoring. These parameters may be predefined, or may by indicated in the NR-PBCH transmission.

Note that, in some embodiments, the frequency gap between a synchronization signal (SS) block and essential CORESET may be defined in accordance with subcarrier spacing used for the transmission of SS blocks, predefined subcarrier spacing, or the subcarrier spacing which is configured for the transmission of NR-PDCCH scheduling RMSI.

Similarly, the slot offset and periodicity of the essential CORESET may be defined m accordance with the slot duration indicated in the NR-PBCH, numerology used for the transmission of SS blocks, or predefined numerology.

Among the above-described parameters, only a subset of parameters, which may be referred to as the "essential" CORESET parameters, may be included in the NR-PBCH, and remaining parameters can be included in the RMSI. The essential CORESET configuration parameters may be parameters that are viewed as essential to the UE to identify a subsequent CORESET transmission. The essential CORESET configuration parameters may include CORESET size or CORESET position in the frequency domain. Slot duration and other information may, in some embodiments, also be included in the NR-PBCH transmission as well. However, there may be no information for on-essential CORESET configuration parameters in NR-PBCH. Instead, for other non-essential CORESET configuration parameters, a "default" mode may be used. For example, the default mode may include information such as a frequency first mapping or a time first mapping for a REG-CCE mapping In some embodiments, frequency first mapping may be defined as a default mode and may be fixed. In some embodiments, one antenna port (AP)-based transmit diversity may be defined as a "default" transmission scheme, and other modes may be indicated in the RMSI. The NR-PDCCH in common CORESET for EMSI, RMSI, or oSI, and also for scheduling of a RAR message, a Msg 3 retransmission, or Msg 4 scheduling, may be specified to follow a distributed CCE-to-REG mapping for NR-PDCCH. In tins embodiment, for UE to receive the NR-PDCCH transmission for the reception of RMSI, the UE may use "essential" CORESET configuration parameters and the default mode.

In some embodiments, if the UE receives the RMSI, the UE may be able to identify "non-essential" CORESET configuration parameters as well as "essential" CORESET configuration parameters, and may be able to use those parameters for the reception of NR-PDCCH in the CORESET after that. In some embodiments, the "essential" CORESET may be a subset of "non-essential" CORESET in terms of time or frequency resources, or in terms of the parameters transmitted. In some embodiments, "essential" CORESET may not overlap or may partially overlap with "non-essential" CORESET. In one embodiment, the "essential" CORESET and the "non-essential" CORESET may be configured in different bandwidth parts.

In some embodiments, the "essential" CORESET may be used for the NR-PDCCH transmission that includes information related to scheduling RMSI, oSI, or another common control message such as paging information or RAR. Alternatively, "essential" CORESET may be used for the NR-PDCCH transmission that includes information related to scheduling RMSI only, while "non-essential" CORESET or a total CORESET may be used for the NR-PDCCH transmission that includes information related to scheduling oSI or some other common control message such as paging information or RAR. As used herein, "total" CORESET may refer to the "essential" and "non-essential" CORESET.

In some embodiments, even for the CORESET size and position, the NR-PBCH transmission may indicate only a part of the total CORESET, and RMSI may indicate detailed information related to the size and position of the total CORESET. The CORESET size or position information in the NR-PBCH may be minimized further. For example, Table 1 may be used, wherein 3 bits may be enough to indicate the CORESET size or position. However, other embodiments may use a different way to indicate the "essential" CORESET configuration parameters with a minimized number of bits.

TABLE 1

| Frequency band size = CORESET span | Frequency position | Number of OFDM symbols |
| --- | --- | --- |
| 5 Megahertz (MHz) | 4 cases | 2 |
| 10 MHz | 2 cases | 2 |
| 20 MHz | 1 | 1 |
| 40 MHz | 1 | 1 |

Further, based on possible configuration of multiple bandwidth (BW) parts in the cell, different common CORESETs may be mapped to different BW parts that may be overlapping or non-overlapping. For instance, common CORESET for RAR/Msg3/Msg4, and in some embodiments oSI scheduling, may be in a different BW part compared to the BW part that may include information related to scheduling EMSI or RMSI. The UE may monitor for NR-PDCCH related to scheduling of paging records in a common CORESET mapped to a different BW part. Such a configuration may be typically used in systems with UEs that may support a limited BW compared to the system BW.

Figure 6:
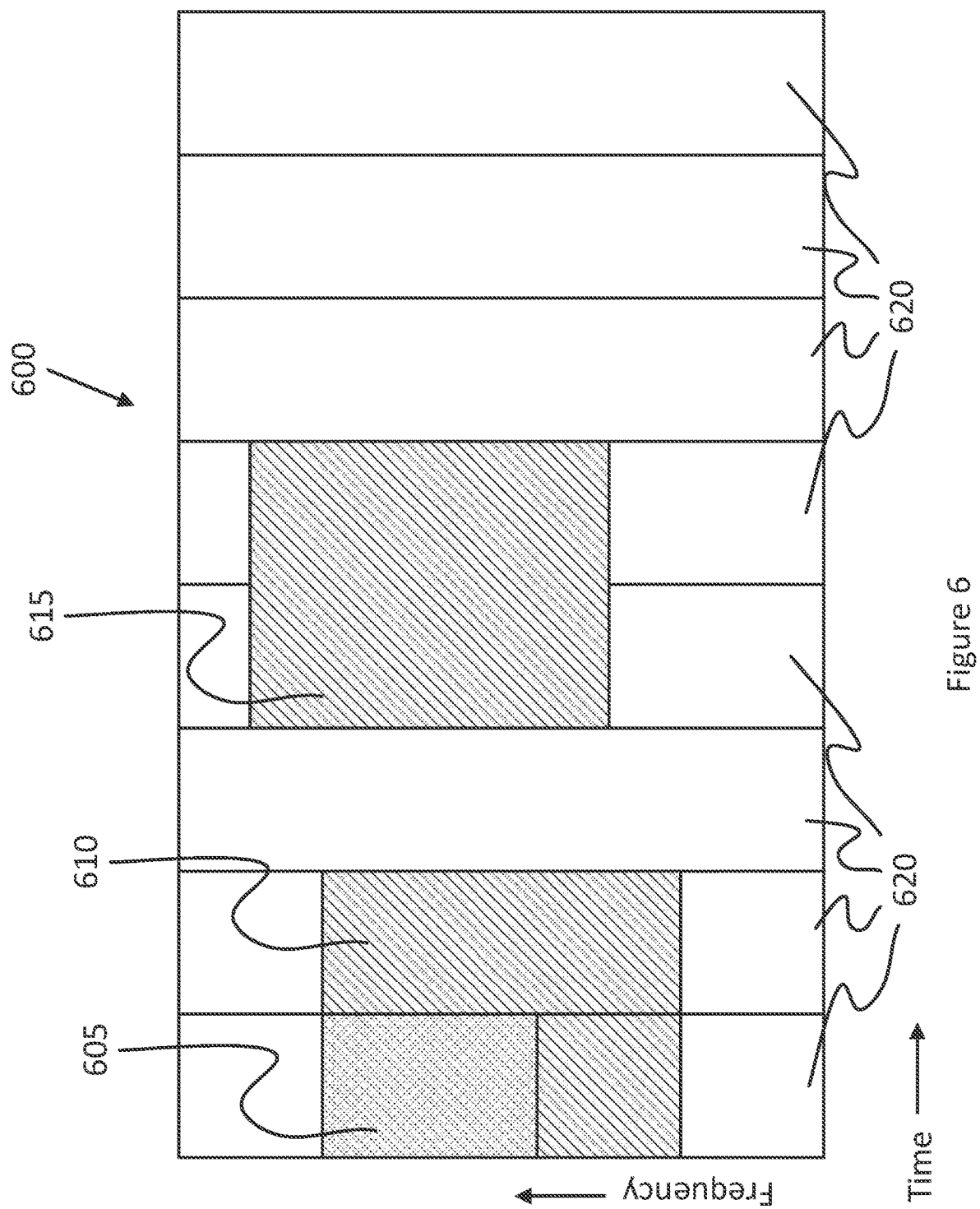
FIG. 6 illustrates an example CORESET transmission in a NR slot, in accordance with various embodiments.

FIG. 6 illustrates an example CORESET transmission in a NR slot 600, in accordance with various embodiments. The NR slot 600 may be made up of a number of OFDM symbols 620. Although only 8 OFDM symbols 620 are depicted in FIG. 6, in other embodiments the NR slot 600 may include more or fewer OFDM symbols such as 14 symbols or some other number.

The "essential" CORESET 605 may be transmitted in a first set of resources. As shown in FIG. 6, the first set of resources may include a single OFDM symbol 620 and span a number of frequency subcarriers. The "non-essential" CORESET may then be transmitted In embodiments, the "non-essential" CORESET may be as depicted at 610, and at least partially overlap the "essential" CORESET 605. For example, the "non-essential" CORESET 610 overlaps the "essential" CORESET 605 in terms of both time and frequency resources, but also includes additional resources in terms of both time and frequency In other embodiments, the "non-essential" CORESET may additional or alternatively be the "non-essential" CORESET 615, which does not overlap the "essential" CORESET 605.

As discussed above, the total CORESET may be considered to be the "essential" CORESET 605 and one or both of the "non-essential" CORESETs 610 and 615. Generally, as discussed above, the configuration information of the "essential" CORESET 605 may be transmitted in the NR- PBCH transmission, and include information regarding the resources on which the UE may identify a subsequent transmission of the "essential" CORESETs for the reception of NR-PDCCH and NR-PDSCH of RMSI or oSI and the configuration information of the "non-essential" CORESET 610 or 615 may be transmitted in RMSI or oSI, as described above.

Note that, as depicted in FIG. 6. "essential" CORESET may be a subset of the total or "non-essential" CORESET. As a further extension, the search space defined in the "essential" CORESET may be a subset of the search space defined for the total CORESET.

In another embodiment, a two-step CORESET configuration may be used. In order to receive the RMSI, the UE may monitor the NR-PDCCH and receive a corresponding NR-PDSCH transmission. Therefore, for the reception of the NR-PDCCH transmission, the NR-PBCH may indicate to the UE which resource to monitor In order to reduce the configuration information included in the NR-PBCH, only "essential" CORESET configuration information may be included in the NR-PBCH. Other configuration information may be included in RMSI or other system information.

Among the various parameters above, only "essential" parameters may be included in the NR-PBCH transmission, and remaining parameters may be included in oSI. In tins embodiment, for the UE to receive the NR-PDCCH transmission before receive "non-essential" CORESET configuration information from the oSI, the UE may use "essential" CORESET configuration parameters and the default mode discussed above. If the UE receives the oSI, it may then know all or some of the "non-essential" CORESET configuration parameters as well as "essential" CORESET configuration parameters, and it may use those parameters for the reception of NR-PDCCH transmissions in the CORESET after that. For tins case, the configuration for the CORESET and search space for NR-PDCCH scheduling of RAR. Msg3, Msg4, etc. may be the same as indicated via the NR-PBCH "essential" CORESET parameter transmission.

In another embodiment, a multi-step CORESET configuration may be used. In tins embodiment, there may be multiple steps for the indication of CORESET configuration parameters. Before receiving a certain CORESET configuration parameter, the UE may operate under a default mode. If the CORESET configuration parameter is received in a NR-PBCH transmission, in the RMSI, in an oSI transmission such as an oSI-1 or oSI-2 transmission, or some other transmission, the UE may use the information after receiving it.

In another embodiment, the NR-PBCH may indicate the physical random access channel (PRACH) format for the cell to which the UE is communicatively coupled. In order to reduce the information bits in the NR-PBCH transmission, the PRACH format may indicate the numerology, including subcarrier spacing, of the NR-PDCCH transmission for RMSI reception, and also the NR-PDCCH for the random access procedure. Because there are multiple PRACH formats that include multiple subcarrier spacings, there may be a mapping between the PRACH format and subcarrier spacing for the NR-PDCCH transmission for the reception of RMSI or for random access procedures.

In another embodiment, the NR-PBCH transmission may indicate the PRACH format for the cell to which the UE is communicatively coupled. In order to reduce the information bits in the NR-PBCH, the combination of the PRACH format and a default numerology on that cell may indicate the numerology, including subcarrier spacing, of the NR-PDCCH transmission for RMSI reception and also the NR-PDCCH for a random access procedure. In this embodiment, "default numerology" may refer to the numerology of the synchronization signal so the UE knows parameters of the synchronization signal before reception of the same.

Figure 7:
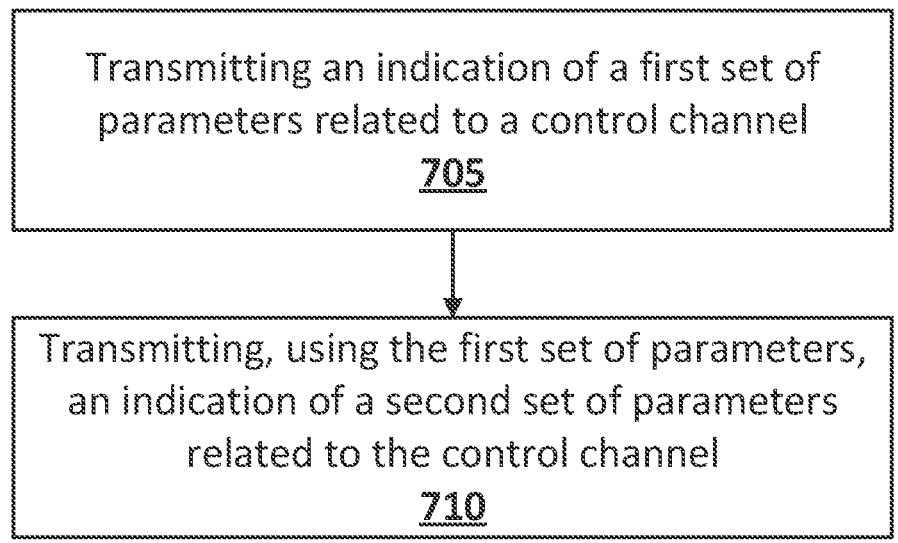
FIG. 7 illustrates an example technique for transmitting control parameters, in accordance with various embodiments.

FIG. 7 illustrates an example technique for transmitting control parameters, in accordance with various embodiments. In embodiments, the technique may include transmitting, by a base station, an indication of a first set of parameters related to a control channel at 705. The first set of parameters may be, for example, the "essential" CORESET parameters discussed above. In embodiments, the first set of parameters may be transmitted in an NR-PBCH transmission. In some embodiments, the first set of parameters may relate to a first set of timing parameters usable by a UE to monitor for the control channel transmission.

The technique may further include transmitting, by the base station using the first set of parameters, an indication of a second set of parameters related to the control channel at 710. In some embodiments, the control channel transmission may be an NR-PDCCH transmission, and may related to a NR-PDSCH transmission that includes remaining RMSI. In some embodiments, the second set of parameters may relate to timing information such as non-essential CORESET information that is usable by a UE to monitor for a subsequent control channel transmission. The subsequent control channel transmission may include, for example, oSI or other control channel information.

Figure 8:
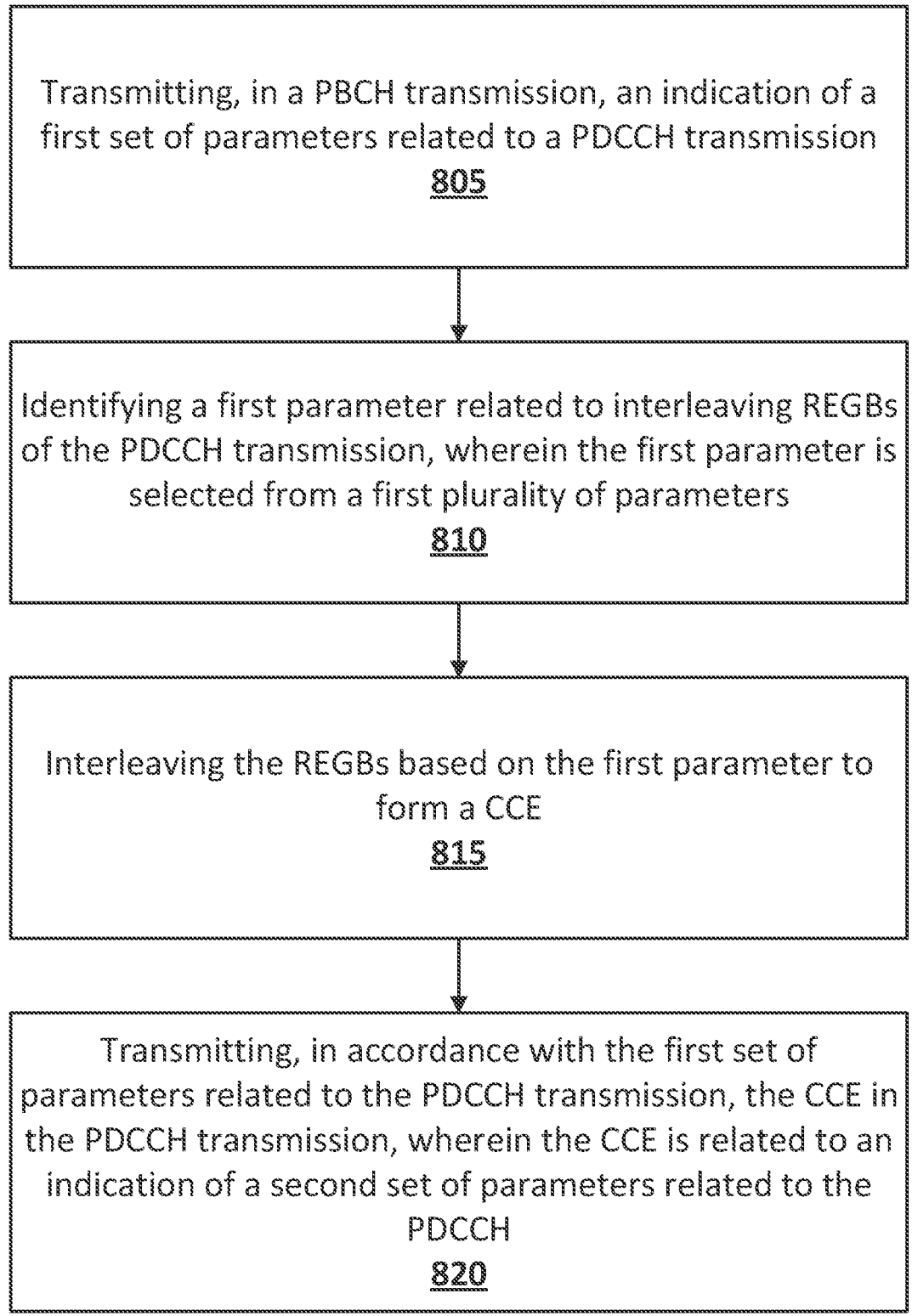
FIG. 8 illustrates an alternative example technique for generating an interleaved PDCCH transmission, in accordance with various embodiments.

FIG. 8 illustrates an alternative example technique for generating an interleaved PDCCH transmission, in accordance with various embodiments. In embodiments, the technique may include transmitting, in a PBCH transmission, an indication of a first set of parameters related to a PDCCH transmission at 805. The PBCH transmission may be an NR-PBCH transmission, and the PDCCH transmission may be an NR-PDCCH transmission In embodiments, the first set of parameters may be timing parameters related to the NR-PDCCH transmission. The indication of the first set of parameters may be, include, or be related to the eMSI as described above, and may include the "essential" CORESET parameters.

The technique may further include identifying, by a base station at 810, a first parameter related to interleaving REGBs of the PDCCH transmission, wherein the first parameter is selected from a first plurality of parameters. The first plurality of parameters may include, for example, the number of stages of the interleaver, the interleaving unit in terms of numbers of REGBs (for a given stage), the number of rows or columns of the interleaving matrix used by the interleaver or a stage of the interleaver, the column-permutation pattern, some other parameter, or some combination of the above.

The technique may further include interleaving, by the base station at 815, the REGBs based on the first parameter to form a CCE. Examples of said interleaving may be, for example, as described above with respect to FIGS. 1-3.

The technique may further include transmitting, by the base station at 820, the CCE in the PDCCH transmission. In embodiments, the transmitting may be performed in accordance with the first set of parameters transmitted at 805. In embodiments, the CCE may be related to an indication of a second set of parameters related to the PDCCH. The second set of parameters may be, for example, timing information usable by the UE to monitor for a subsequent NR-PDCCH or NR-PDSCH transmission.

It will be understood that the above-described techniques are intended as examples. In some embodiments, certain of the elements may be removed or replaced. Some embodiments of techniques herein may also have additional elements.

Figure 9:
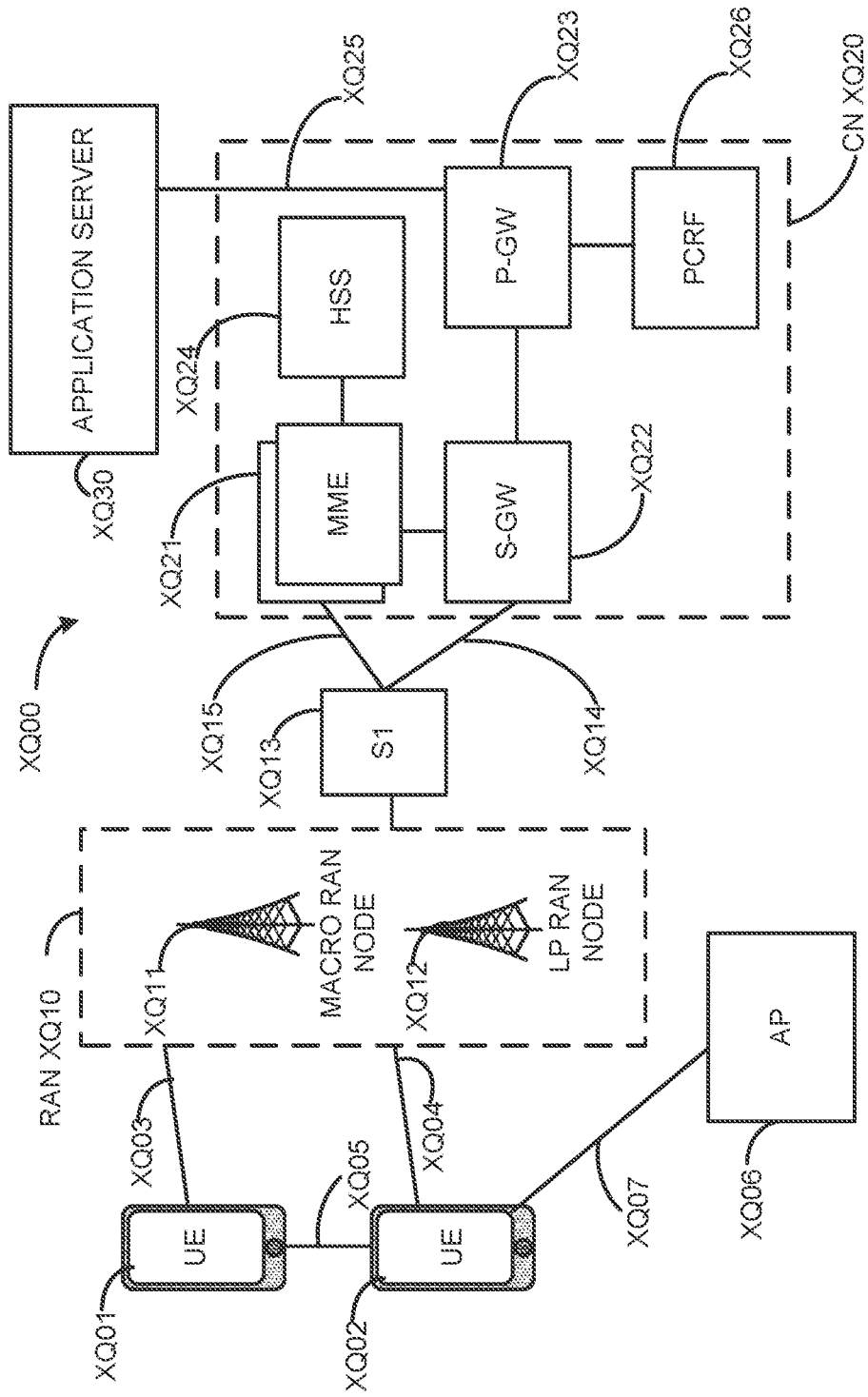
FIG. 9 illustrates an example architecture of a system of a network, in accordance with various embodiments.

FIG. 9 illustrates an architecture of a system XQ00 of a network in accordance with some embodiments. The system XQ00 is shown to include a user equipment (UE) XQ01 and a UE XQ02. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs XQ01 and XQ02 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs). Electronic Engine Management System (EEMS), electronic/engine control units (ECUs), electronic/engine control modules (ECMs), embedded systems, microcontrollers, control modules, engine management systems (EMS), networked or "'smart'" appliances, machine-type communications (MTC) devices, machine-to-machine (M2M), Internet of Things (IoT) devices, and or the like.

In some embodiments, any of the UEs XQ01 and XQ02 can comprise an Internet of Things (IoT) UE, which can comprise a network access layer designed for low power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XQ01 and XQ02 may be configured to connect, e.g. communicatively couple, with a radio access network (RAN) XQ10. The RAN XQ10 may be, for example, an Evolved Universal Mobile Telecommunications System (UMTS) Terrestrial Radio Access Network (E-UTRAN), a NextGen RAN (NG RAN), or some other type of RAN. The UEs XQ01 and XQ02 utilize connections (or channels) XQ03 and XQ04, respectively, each of which comprises a physical communications interface or layer (discussed in further detail infra). As used herein, the term "channel" may refer to any transmission medium, either tangible or intangible, which is used to communicate data or a data stream.

The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections XQ03 and XQ04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XQ01 and XQ02 may further directly exchange communication data via a ProSe interface XQ05. The ProSe interface XQ05 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface XQ05 may be used in vehicular applications and communications technologies, which are often referred to as V2X systems. V2X is a mode of communication where UEs (for example, UEs XQ01, XQ02) communicate with each other directly over the PC5/SL interface XQ05 and can take place when the UEs XQ01, XQ02 are served by RAN nodes XQ11, XQ12 or when one or more UEs are outside a coverage area of the RAN XQ10. V2X may be classified into four different types: vehicle-to-vehicle (V2V), vehicle-to-infrastructure (V2I), vehicle-to-network (V2N), and vehicle-to-pedestrian (V2P). These V2X applications can use "cooperative awareness" to provide more intelligent services for end-users. For example, vehicle UEs (vUEs) XQ01, XQ02, RAN nodes XQ11, XQ12, application servers XQ30, and pedestrian UEs XQ01, XQ02 may collect knowledge of their local environment (for example, information received from other vehicles or sensor equipment in proximity) to process and share that knowledge in order to provide more intelligent services, such as cooperative collision warning, autonomous driving, and the like In these implementations, the UEs XQ01, XQ02 may be implemented/employed as Vehicle Embedded Communications Systems (VECS) or vUEs.

The UE XQ02 is shown to be configured to access an access point (AP) XQ06 (also referred to as "WLAN node XQ06", "WLAN XQ06" "WLAN Termination XQ06" or "WT XQ06" or the like) via connection XQ07. The connection XQ07 can comprise a local wireless connection, such as a connection consistent with any IEEE 802.11 protocol, wherein the AP XQ06 would comprise a wireless fidelity (WiFi®) router In this example, the AP XQ06 is shown to be connected to the Internet without connecting to the core network of the wireless system (described in further detail below). In various embodiments, the UE XQ02, RAN XQ10, and AP XQ06 may be configured to utilize LTE-WLAN aggregation (LWA) operation and/or WLAN LTE/WLAN Radio Level Integration with IPsec Tunnel (LWIP) operation. The LWA operation may involve the UE XQ02 in RRC_CONNECTED being configured by a RAN node XQ11, XQ12 to utilize radio resources of LTE and WLAN. LWIP operation may involve the UE XQ02 using WLAN radio resources (e.g., connection XQ07) via Internet Protocol Security (IPsec) protocol tunneling to authenticate and encrypt packets (e.g., internet protocol (IP) packets) sent over the connection XQ07. IPsec tunneling may include encapsulating entirety of original IP packets and adding a new packet header, thereby protecting the original header of the IP packets.

The RAN XQ10 can include one or more access nodes that enable the connections XQ03 and XQ04 As used herein, the terms "access node," "access point," or the like may describe equipment that provides the radio baseband functions for data and/or voice connectivity between a network and one or more users. As described above, these access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN XQ10 may include one or more RAN nodes for providing macrocells, e.g., macro RAN node XQ11, and one or more RAN nodes for providing femtocells or picocells (e.g., cells having smaller coverage areas, smaller user capacity, or higher bandwidth compared to macrocells), e.g., low power (LP) RAN node XQ12.

Any of the RAN nodes XQ11 and XQ12 can terminate the air interface protocol and can be the first point of contact for the UEs XQ01 and XQ02. In some embodiments, any of the RAN nodes XQ11 and XQ12 can fulfill various logical functions for the RAN XQ10 including, but not limited to, radio network controller (RNC) functions such as radio bearer management, uplink and downlink dynamic radio resource management and data packet scheduling, and mobility management.

In accordance with some embodiments, the UEs XQ01 and XQ02 can be configured to communicate using Orthogonal Frequency Division Multiplexing (OFDM) communication signals with each other or with any of the RAN nodes XQ11 and XQ12 over a multicarrier communication channel in accordance with various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XQ11 and XQ12 to the UEs XQ01 and XQ02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements, in the frequency domain, this may represent the smallest quantity of resources that currently can be allocated. There are several different physical downlink channels that are conveyed using such resource blocks.

According to various embodiments, the UEs XQ01, XQ02 and the RAN nodes XQ11, XQ12 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs XQ01, XQ02 and the RAN nodes XQ11, XQ12 may operate using Licensed Assisted Access (LAA), enhanced LAA (eLAA), and/or further eLAA (feLAA) mechanisms. In these implementations, the UEs XQ01, XQ02 and the RAN nodes XQ11, XQ12 may perform one or more known medium sensing operations and/or carrier sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs XQ01, XQ02, RAN nodes XQ11, XQ12, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies WLAN employs a contention-based channel access mechanism, called carrier sense multiple access with collision avoidance (CSMA/CA). Here, when a WLAN node (e.g., a mobile station (MS) such as UE XQ01 or XQ02, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or physical uplink shared channel (PUSCH) transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1, 4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathless. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE XQ01, XQ02 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The physical downlink shared channel (PDSCH) may carry user data and higher-layer signaling to the UEs XQ01 and XQ02. The physical downlink control channel (PDCCH) may carry information about the transport format and resource allocations related to the PDSCH channel, among other things. It may also inform the UEs XQ01 and XQ02 about the transport format, resource allocation, and H-ARQ (Hybrid Automatic Repeat Request) information related to the uplink shared channel. Typically, downlink scheduling (assigning control and shared channel resource blocks to the UE XQ02 within a cell) may be performed at any of the RAN nodes XQ11 and XQ12 based on channel quality information fed back from any of the UEs XQ01 and XQ02 The downlink resource assignment information may be sent on the PDCCH used for (e.g., assigned to) each of the UEs XQ01 and XQ02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN XQ10 is shown to be communicatively coupled to a core network (CN) XQ20 via an S1 interface XQ13. In embodiments, the CN XQ20 may be an evolved packet core (EPC) network, a NextGen Packet Core (NPC) network, or some other type of CN. In this embodiment the S1 interface XQ13 is split into two parts the S1-U interface XQ14, which carries traffic data between the RAN nodes XQ11 and XQ12 and the serving gateway (S-GW) XQ22, and the S1-mobility management entity (MME) interface XQ15, which is a signaling interface between the RAN nodes XQ11 and XQ12 and MMEs XQ21.

In this embodiment, the CN XQ20 comprises the MMEs XQ21, the S-GW XQ22, the Packet Data Network (PDN) Gateway (P-GW) XQ23, and a home subscriber server (HSS) XQ24. The MMEs XQ21 may be similar in function to the control plane of legacy Serving General Packet Radio Service (GPRS) Support Nodes (SGSN). The MMEs XQ21 may manage mobility aspects in access such as gateway selection and tracking area list management. The HSS XQ24 may comprise a database for network users, including subscription-related information to support the network entities' handling of communication sessions. The CN XQ20 may comprise one or several HSSs XQ24, depending on the number of mobile subscribers, on the capacity of the equipment, on the organization of the network, etc. For example, the HSS XQ24 can provide support for routing roaming, authentication, authorization, naming/addressing resolution, location dependencies, etc.

The S-GW XQ22 may terminate the S1 interface XQ13 towards the RAN XQ10, and routes data packets between the RAN XQ10 and the CN XQ20. In addition, the S-GW XQ22 may be a local mobility anchor point for inter-RAN node handovers and also may provide an anchor for inter-3GPP mobility. Other responsibilities may include lawful intercept, charging, and some policy enforcement.

The P-GW XQ23 may terminate an SGi interface towards a PDN. The P-GW XQ23 may route data packets between the EPC network XQ20 and external networks such as a network including the application server XQ30 (alternatively referred to as application function (AF)) via an Internet Protocol (IP) interface XQ25. Generally, the application server XQ30 may be an element offering applications that use IP bearer resources with the core network (e.g., UMTS Packet Services (PS) domain, LTE PS data services, etc.). In this embodiment, the P-GW XQ23 is shown to be communicatively coupled to an application server XQ30 via an IP communications interface XQ25. The application server XQ30 can also be configured to support one or more communication services (e.g., Voice-over-Internet Protocol (VoIP) sessions, PTT sessions, group communication sessions, social networking services, etc.) for the UEs XQ01 and XQ02 via the CN XQ20.

The P-GW XQ23 may further be a node for policy enforcement and charging data collection. Policy and Charging Rules Function (PCRF) XQ26 is the policy and charging control element of the CN XQ20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF XQ26 may be communicatively coupled to the application server XQ30 via the P-GW XQ23. The application server XQ30 may signal the PCRF XQ26 to indicate a new service flow and select the appropriate Quality of Service (QoS) and charging parameters. The PCRF XQ26 may provision this rule into a Policy and Charging Enforcement Function (PCEF) (not shown) with the appropriate traffic flow template (TFT) and QoS class of identifier (QCI), which commences the QoS and charging as specified by the application server XQ30.

Figure 10:
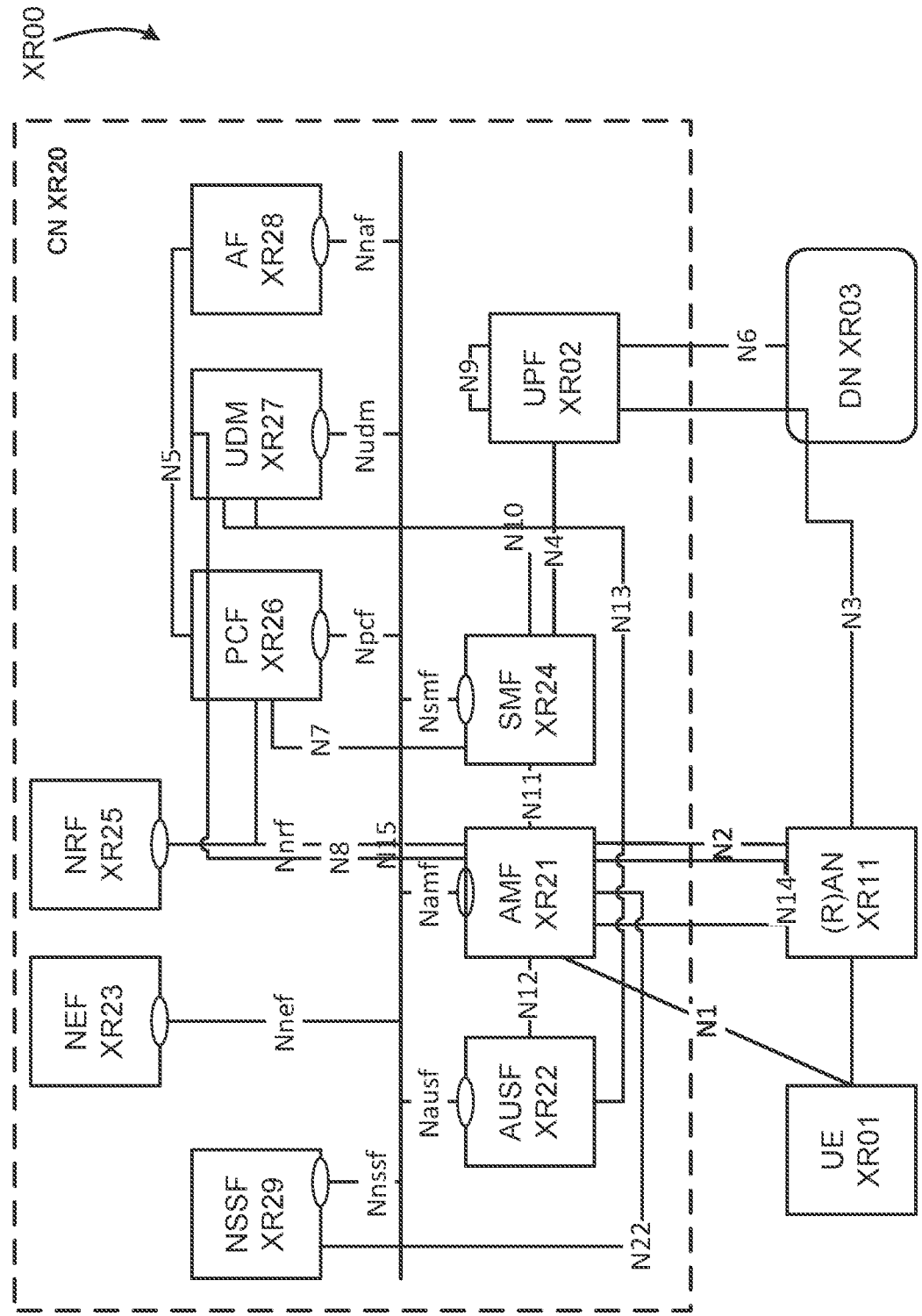
FIG. 10 illustrates an alternative example architecture of a system of a network, in accordance with various embodiments.

FIG. 10 illustrates an architecture of a system XR00 of a network in accordance with some embodiments. The system XR00 is shown to include a UE XR01, which may be the same or similar to UEs XQ01 and XQ02 discussed previously; a RAN node XR11, which may be the same or similar to RAN nodes XQ11 and XQ12 discussed previously; a Data Network (DN) XR03, which may be, for example, operator services, Internet access or 3rd party services, and a 5G Core Network (5GC or CN) XR20.

The CN XR20 may include an Authentication Server Function (AUSF) XR22; an Access and Mobility Management Function (AMF) XR21; a Session Management Function (SMF) XR24; a Network Exposure Function (NEF) XR23: a Policy Control Function (PCF) XR26; a Network Function (NF) Repository Function (NRF) XR25; a Unified Data Management CUDM) XR27; an AF XR28; a User Plane Function (UPF) XR02; and a Network Slice Selection Function (NSSF) XR29.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, perform packet inspection, enforce user plane part of policy rules, lawfully intercept packets (UP collection), traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. DN XR03 may include, or be similar to, application server XQ30 discussed previously. The UPF XR02 may interact with the SMF XR24 via an N4 reference point between the SMF XR24 and the UPF XR02.

The AUSF XR22 may store data for authentication of UE XR01 and handle authentication related functionality. The AUSF XR22 may facilitate a common authentication framework for various access types. The AUSF XR22 may communicate with the AMF XR21 via an N12 reference point between the AMF XR21 and the AUSF XR22; and may communicate with the UDM XR27 via an N13 reference point between the UDM XR27 and the AUSF XR22. Additionally, the AUSF XR22 may exhibit an Nausf service-based interface.

The AMF XR21 may be responsible for registration management (e.g., for registering UE XR01, etc.), connection management, reachability management, mobility management, and lawful interception of AMF-related events, and access authentication and authorization. The AMF XR21 may be a termination point for an N11 reference point between the AMF XR21 and the SMF XR24. The AMF XR21 may provide transport for Session Management (SM) messages between the UE XR01 and the SMF XR24, and act as a transparent proxy for routing SM messages AMF XR21 may also provide transport for short message service (SMS) messages between UE XR01 and an SMS function (SMSF) (not shown by FIG. XR). AMF XR21 may act as Security Anchor Function (SEAF), which may include interaction with the AUSF XR22 and the UE XR01, as well as receipt of an intermediate key that was established as a result of the UE XR01 authentication process. Where UMTS Subscriber Identity Module (USIM) based authentication is used, the AMF XR21 may retrieve the security material from the AUSF XR22. AMF XR21 may also include a Security Context Management (SCM) function, which receives a key from the SEAF that it uses to derive access network specific keys. Furthermore, AMF XR21 may be a termination point of RAN CP interface, which may include or be an N2 reference point between the (R)AN XR11 and the AMF XR21, and the AMF XR21 may be a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N3IWF may be a termination point for the N2 interface between the (R)AN XR11 and the AMF XR21 for the control plane, and may be a termination point for the N3 reference point between the (R)AN XR11 and the UPF XR02 for the user plane. As such, the AMF XR21 may handle N2 signalling from the SMF XR24 and the AMF XR21 for PDU sessions and QoS, encapsulate de-encapsulate packets for IPSec and N3 tunneling, mark N3 user plane packets in the uplink, and enforce QoS corresponding to N3 packet marking, which may take into account QoS requirements associated to such marking received over N2. N3IWF may also relay uplink and downlink control plane NAS signalling between the UE XR01 and AMF XR21 via an N1 reference point between the UE XR01 and the AMF XR21, and relay uplink and downlink user plane packets between the UE XR01 and UPF XR02. The N3IWF also provides mechanisms for IPsec tunnel establishment with the UE XR01. The AMF XR21 may exhibit an Namf service-based interlace, and may be a termination point for an N14 reference point between two AMFs XR21 and an N17 reference point between the AMF XR21 and a 5G-Equipment Identity Register (5G-EIR) (not shown by FIG. XR).

The SMF XR24 may be responsible for session management (e.g., session establishment, modify and release, including tunnel maintain between UPF and AN node). The SMF XR24 may also allocate and manage UE IP addresses (including optional authorization), select and control UP functions, and configures traffic steering at the UPF XR02 to route traffic to a proper destination. The SMF XR24 may also terminate interfaces towards Policy Control Functions, control part of policy enforcement and QoS, and perform lawful interception (e.g., for SM events and interface to LI system). The SMF XR24 may also terminate SM parts of NAS messages, provide downlink data notification, and initiate AN specific SM information, sent via AMF over N2 to AN, and determine Session and Service Continuity (SSC) mode of a session.

The SMF XR24 may include the following roaming functionality: handle local enforcement to apply QoS SLAs (VPLMN), charging data collection and charging interface (VPLMN); lawful intercept (in VPLMN for SM events and interface to LI System); and support for interaction with external DN for transport of signalling for PDU session authorization/authentication by external DN. An N16 reference point between two SMFs XR24 may be included in the system XR00, which may be between another SMF XR24 in a visited network and the SMF XR24 in the home network in roaming scenarios. Additionally, the SMF XR24 may exhibit the Nsmf service-based interface.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-identifier and an internal 5GC information. NEF XR23 may also receive information from other network functions (NFs) based on exposed capabilities of other network functions. This information may be stored at the NEF XR23 as structured data, or at a data storage NF using standardized interfaces. The stored information can then be re-exposed by the NEF XR23 to other NFs and AFs, and/or used for other purposes such as analytics. Additionally, the NEF XR23 may exhibit an Nnef service-based interface.

The NRF XR25 may support service discovery functions, receive NF Discovery Requests from NF instances, and provide the information of the discovered NF instances to the NF instances. NRF XR25 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF XR25 may exhibit the Nnrf service-based interface.

The PCF XR26 may provide policy rules to control plane function(s) to enforce them, and may also support unified policy framework to govern network behavior. The PCF XR26 may also implement a front end (FE) to access subscription information relevant for policy-decisions in a Unified Data Repository (DDR) of the UDM XR27. The PCF XR26 may communicate with the AMF XR21 via an N15 reference point between the PCF XR26 and the AMF XR21, which may include a PCF XR26 in a visited network and the AMF XR21 in case of roaming scenarios. The PCF XR26 may communicate with the AF XR28 via an N5 reference point between the PCF XR26 and the AF XR28; and with the SMF XR24 via an N7 reference point between the PCF XR26 and the SMF XR24. The system XR00 and/or CN XR20 may also include an N24 reference point between the PCF XR26 On the home network) and a PCF XR26 in a visited network. Additionally, the PCF XR26 may exhibit an Npcf service-based interface.

The UDM XR27 may handle subscription-related information to support the network entities' handling of communication sessions, and may store subscription data of UE XR01. For example, subscription data may be communicated between the UDM XR27 and the AMF XR21 via an N8 reference point between the UDM XR27 and the AMF XR21 (hot shown by FIG. XR). The UDM XR27 may include two parts, an application FE and a User Data Repository (UDR) (the FE and UDR are not shown by FIG. XR). The UDR may store subscription data and policy data for the UDM XR27 and the PCF XR26, and/or structured data for exposure and application data (including Packet Flow Descriptions (PFDs) for application detection, application request information for multiple UEs XR01) for the NEF XR23. The Nudr service-based interface may be exhibited by the UDR to allow the UDM XR27, PCF XR26, and NEF XR23 to access a particular set of the stored data, as well as to read, update (e.g., add, modify), delete, and subscribe to notification of relevant data changes in the UDR. The UDM XR27 may include a UDM FE, which is in charge of processing credentials, location management, subscription management and so on Several different front aids may serve the same user in different transactions. The UDM FE accesses subscription information stored in the UDR and performs authentication credential processing; user identification handling, access authorization; registration/mobility management; and subscription management. The UDM may interact with the SMF XR24 via an N10 reference point between the UDM XR27 and the SMF XR24. UDM XR27 may also support SMS management, wherein an SMS-FE implements the similar application logic as discussed previously. Additionally, the UDM XR27 may exhibit the Nudm service-based interface.

The AF XR28 may provide application influence on traffic routing, provide access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE, location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs. Additionally, the AF XR28 may exhibit an Naf service-based interface.

The NSSF XR29 may select a set of network slice instances serving the UE XR01. The NSSF XR29 may also determine allowed Network Slice Selection Assistance Information (NSSAI) and the mapping to the Subscribed Single-NSSAIs (S-NSSAIs), if needed. The NSSF XR29 may also determine the AMF set to be used to serve the UE XR01, or a list of candidate AMF(s) XR21 based on a suitable configuration and possibly by querying the NRF XR25. The selection of a set of network slice instances for the UE XR01 may be triggered by the AMF XR21 with which the UE XR01 is registered by interacting with the NSSF XR29, which may lead to a change of AMF XR21. The NSSF XR29 may interact with the AMF XR21 via an N22 reference point between AMF XR21 and NSSF XR29; and may communicate with another NSSF XR29 in a visited network via an N31 reference point (not shown by FIG. XR). Additionally, the NSSF XR29 may exhibit an Nnssf service-based interface.

As discussed previously, the CN XR20 may include an SMSF, which may be responsible for SMS subscription checking and verification, and relaying SM messages to/from the UE XR01 to/from other entities, such as an Short Message Service (SMS)-Global Systems for Mobile Communication (GMSC)/Interworking Mobile Switching Center (IWMSC)/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The CN XR20 may also include other elements that are not shown by FIG. XR, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. XR). Individual NFs may share a UDSF for storing their respective unstructured data or individual NFs may each have their own UDSF located at or near the individual NFs. Additionally, the UDSF may exhibit an Nudsf service-based interface (not shown by FIG. XR). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs, however, these interfaces and reference points have been omitted from FIG. XR for clarity. In one example, the CN XR20 may include an Nx interface, which is an inter-CN interface between the MME (e.g., MME XQ21) and the AMF XR21 in order to enable interworking between CN XR20 and CN XQ20. Other example interfaces/reference points may include an N5g-EIR service-based interface exhibited by a 5G-EIR, an N27 reference point between an NRF in the visited network and the NRF in the home network: and an N31 reference point between the NSSF in the visited network and the NSSF in the home network.

In yet another example, system XR00 may include multiple RAN nodes XR11 wherein an Xn interface is defined between two or more RAN nodes XR11 (e.g., gNBs and the like) connecting to 5GC XR20, between a RAN node XR11 (e.g., gNB) connecting to 5GC XR20 and an eNB (e.g., a RAN node XQ11 of FIG. XQ), and/or between two eNBs connecting to 5GC XR20. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; and mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages In the transport IP layer point-to-point transmission is used to deliver the signaling PDUs. In other implementations, the Xn-U protocol stack and/or the Xn-C protocol stack may be the same or similar to the user plane and/or control plane protocol slack(s) shown and described herein.

Figure 11:
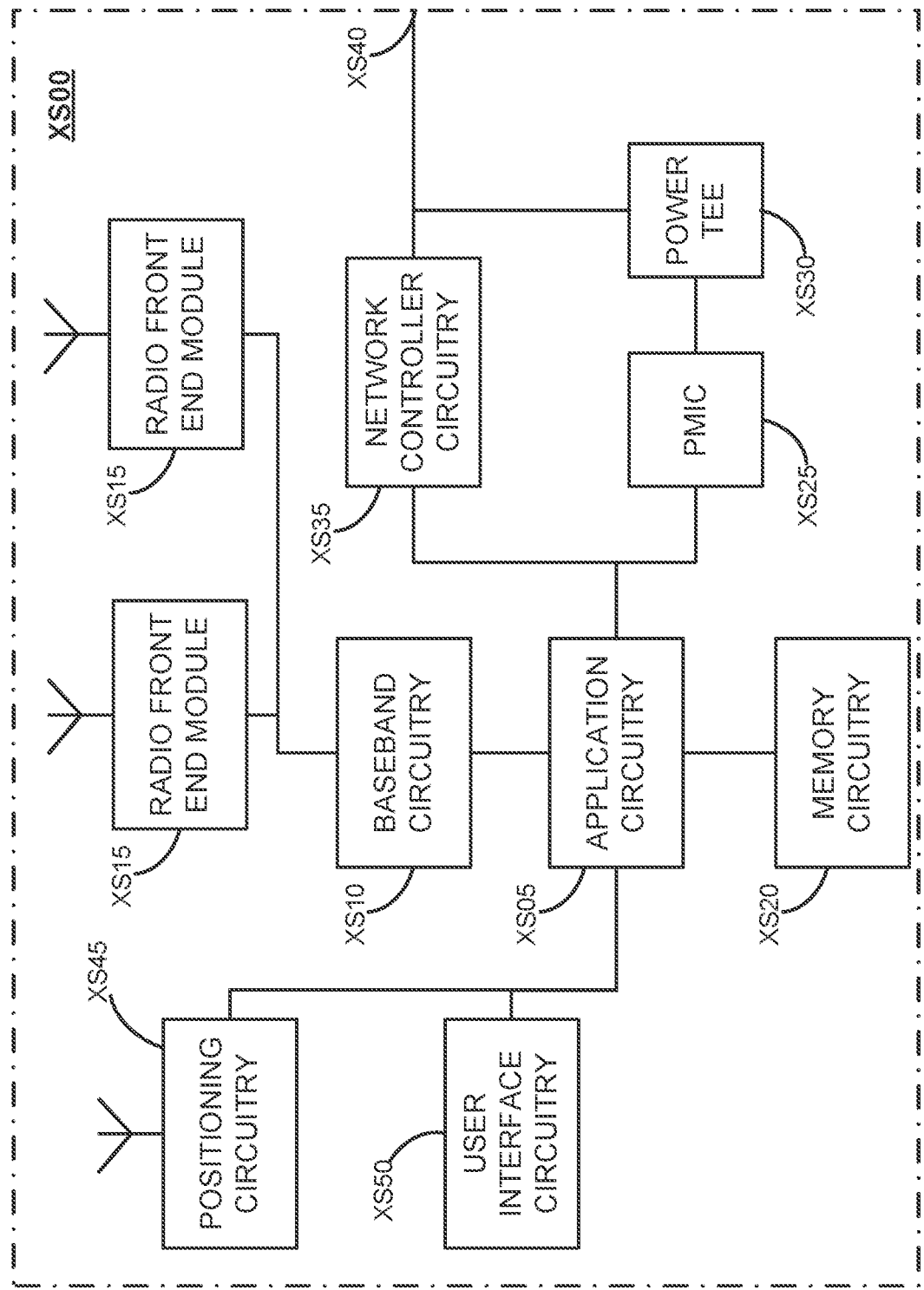
FIG. 11 illustrates an example of infrastructure equipment, in accordance with various embodiments.

FIG. 11 illustrates an example of infrastructure equipment XS00 in accordance with various embodiments. The infrastructure equipment XS00 (or "system XS00") may be implemented as a base station, radio head. RAN node, etc., such as the RAN nodes XQ11 and XQ12, and/or AP XQ06 shown and described previously. In other examples, the system XS00 could be implemented in or by a UE, application servers) XQ30, and/or any other element/device discussed herein. The system XS00 may include one or more of application circuitry XS05, baseband circuitry XS10, one or more radio front end modules XS15, memory XS20, power management integrated circuitry (PMIC) XS25, power tee circuitry XS30, network controller XS35, network interface connector XS40, satellite positioning circuitry XS45, and user interface XS50. In some embodiments, the device XT00 may include additional elements such as, for example, memory/storage, display, camera, sensor, or input/output (I/O) interface In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuit" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network XQ20 (or CN XR20 discussed previously) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network deuce, gateway, server, virtualized network function (VNF), network functions virtualization infrastructure (NFVI), and/or the like.

Application circuitry XS05 may include one or more central processing unit (CPU) cores and one or more of cache memory, low drop-out voltage regulators (LDOs), interrupt controllers, serial interfaces such as SPI, I2C or universal programmable serial interface module, real lime clock (RTC), timer-counters including interval and watchdog timers, general purpose input/output (I/O or IO), memory card controllers such as Secure Digital (SD/)MultiMediaCard (MMC) or similar. Universal Serial Bus (USB) interfaces, Mobile Industry Processor Interface (MIPI) interfaces and Joint Test Access Group (JTAG) test access ports. As examples, the application circuitry XS05 may include one or more Intel Pentium®, Core®, or Xeon® processors); Advanced Micro Devices (AMD) Ryzen® processors), Accelerated Processing Units (APUs), or Epyc® processors, and/or the like. In some embodiments, the system XS00 may not utilize application circuitry XS05, and instead may include a special-purpose processor-controller to process IP data received from an EPC or 5GC, for example.

Additionally or alternatively, application circuitry XS05 may include circuitry such as, but not limited to, one or more field-programmable devices (FPDs) such as field-programmable gate arrays (FPGAs) and the like, programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XS05 may comprise logic blocks or logic fabric including other interconnected resources that may be programmed to perform various functions, such as the procedures, methods, functions, etc. of the various embodiments discussed herein. In such embodiments, the circuitry of application circuitry XS05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XS10 may be implemented, for example, as a solder down substrate including one or more integrated circuits, a single packaged integrated circuit soldered to a main circuit board or a multi-chip module containing two or more integrated circuits. Although not shown, baseband circuitry XS10 may comprise one or more digital baseband systems, which may be coupled via an interconnect subsystem to a CPU subsystem, an audio subsystem, and an interface subsystem. The digital baseband subsystems may also be coupled to a digital baseband interlace and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XS10 may include protocol processing circuitry with one or more instances of control circuitry (not shown) to provide control functions for the digital baseband circuitry and/or radio frequency circuitry (for example, the radio front end modules XS15).

User interface circuitry XS50 may include one or more user interfaces designed to enable user interaction with the system XS00 or peripheral component interfaces designed to enable peripheral component interaction with the system XS00. User interfaces may include, but are not limited to, one or more physical or virtual buttons (e.g., a reset button), one or more indicators (e.g. light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XS20 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry XS20 may be implemented as one or more of solder down packaged integrated circuits, socketed memory modules and plug-in memory cards.

The PMIC XS25 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry XS30 may provide for electrical power drawn from a network cable to provide both power supply and data connectivity to the infrastructure equipment XS00 using a single cable.

The network controller circuitry XS35 may provide connectivity to a network using a standard network interface protocol such as Ethernet, Ethernet over GRE Tunnels, Ethernet over Multiprotocol Label Switching (MPLS), or some other suitable protocol Network connectivity may be provided to/from the infrastructure equipment XS00 via network interface connector XS40 using a physical connection, which may be electrical (commonly referred to as a "copper interconnect"), optical, or wireless. The network controller circuitry XS35 may include one or more dedicated processors and/or FPGAs to communicate using one or more of the aforementioned protocol. In some implementations, the network controller circuitry XS35 may include multiple controllers to provide connectivity to other networks using the same or different protocols.

The positioning circuitry XS45 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry XS45 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry XS45 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry XS45 may include a Micro-Technology for Positioning, Navigation, and Timing (Micro-PNT) IC that uses a master timing clock to perform position tracking-estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry XS45 may provide data to application circuitry XS05, which may include one or more of position data or time data. Application circuitry XS05 may use the time data to synchronize operations with other radio base stations (e.g., RAN nodes XQ11, XQ12, XR11 or the like).

The components shown by FIG. XS may communicate with one another using interface circuitry. As used herein, the term "interface circuitry" may refer to, is part of, or includes circuitry providing for the exchange of information between two or more components or deuces. The term "interface circuitry" may refer to one or more hardware interfaces, for example, bases, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point-to-point interfaces, and a power bus, among others.

Figure 12:
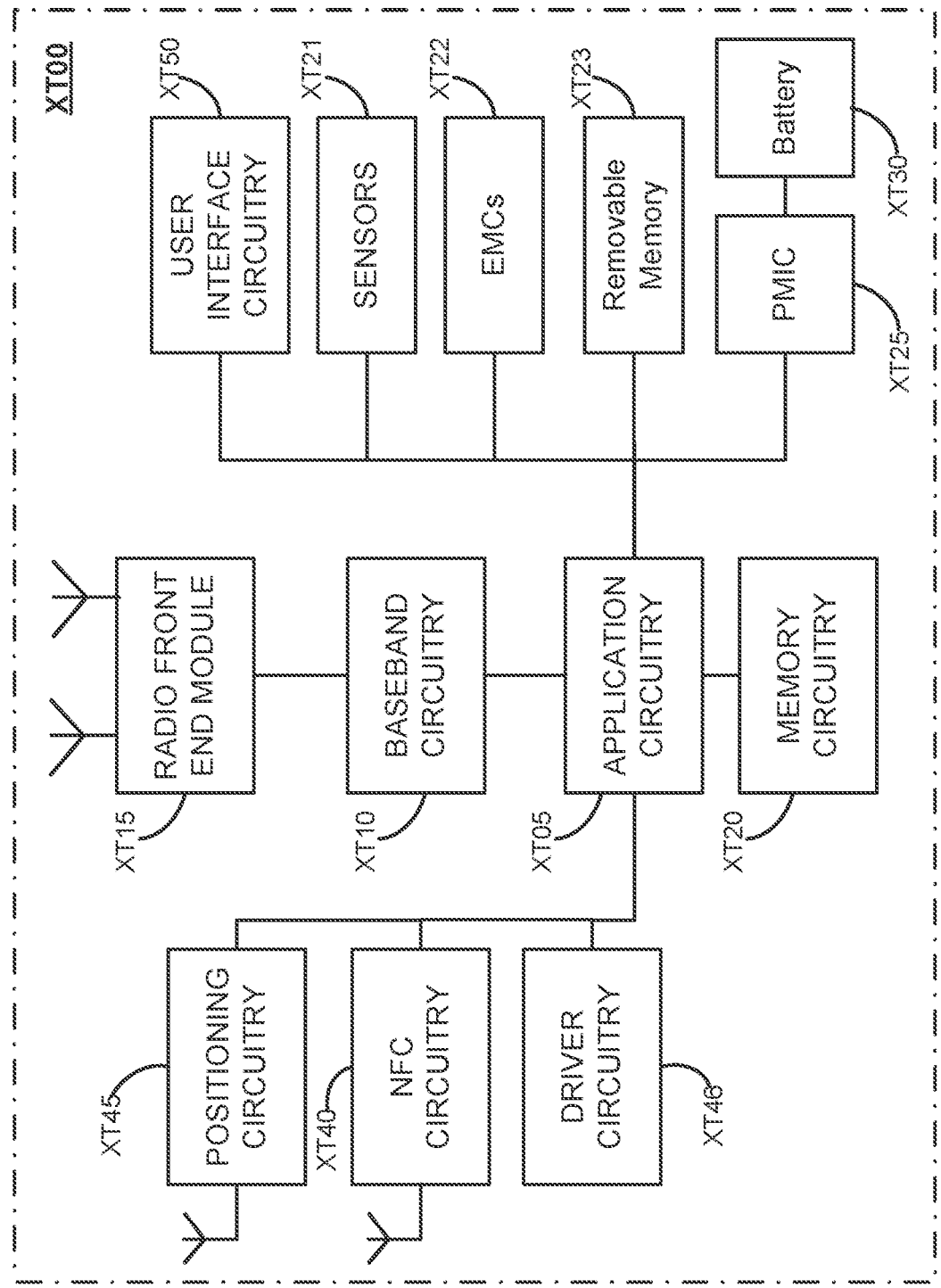
FIG. 12 illustrates an example of a computer platform, in accordance with various embodiments.

FIG. 12 illustrates an example of a platform XT00 (or "device XT00") m accordance with various embodiments In embodiments, the computer platform XT00 may be suitable for use as UEs XQ01, XQ02, XR01, application servers XQ30, and/or any other element/device discussed herein. The platform XT00 may include any combinations of the components shown in the example. The components of platform XT00 may be implemented as integrated circuits (IC's), portions thereof, discrete electronic devices, or other modules, logic, hardware, software, firmware, or a combination thereof adapted in the computer platform XT00, or as components otherwise incorporated within a chassis of a larger system. The block diagram of FIG. XT1 is intended to show a high level view of components of the computer platform XT00. However, some of the components shown may be omitted, additional components may be present, and different arrangement of the components shown may occur in other implementations.

The application circuitry XT05 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input/output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processors) may include any combination of general-purpose processors and/or dedicated processors (e.g., graphics processors, application processors, etc.). The processors (or cores) may be coupled with or may include memory/storage and may be configured to execute instructions stored in the memory storage to enable various applications or operating systems to run on the platform XT00. In some embodiments, processors of application circuitry XS05/XT05 may process IP data packets received from an EPC or 5GC.

Application circuitry XT05 may be or may include a microprocessor, a multi-core processor, a multithreaded processor, an ultra-low voltage processor, an embedded processor, or other known processing element In one example, the application circuitry XT05 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry XT05 may also be one or more of AMD Ryzen® processors) or APUs: A5-A9 processors) from Apple® Inc., Snapdragon™ processors) from Qualcomm® Technologies, Inc., Texas Instruments, Inc.® Open Multimedia Applications Platform (OMAP)™ processors); a MIPS-based design from MIPS Technologies, Inc, an ARM-based design licensed from ARM Holdings, Ltd.; or the like. In some implementations, the application circuitry XT05 may be a part of a system on a chip (SoC) in which the application circuitry XT05 and other components are formed into a single integrated circuit, or a single package, such as the Edison™ or Galileo™ SoC boards from Intel® Corporation.

Additionally or alternatively, application circuitry XT05 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like. ASICs such as structured ASICs and the like; programmable SoCs (PSoCs); and the like. In such embodiments, the circuitry of application circuitry XT05 may comprise logic blocks or logic fabric including other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XT10 may be implemented, for example, as a solder down substrate including one or more integrated circuits, a single packaged integrated circuit soldered to a main circuit board or a multi-chip module containing two or more integrated circuits. Although not shown, baseband circuitry XT10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components In an aspect of the present disclosure, baseband circuitry XT10 may include protocol processing circuitry with one or more instances of control circuitry (not shown) to provide control functions for the digital baseband circuitry and/or radio frequency-circuitry (for example, the radio front end modules XT15).

The radio front end modules (RFEMs) XT15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XT15. The RFEMs XT15 may incorporate both millimeter wave antennas and sub-millimeter wave antennas.

The memory circuitry XT20 may include any number and type of memory devices used to provide for a given amount of system memory. As examples, the memory circuitry XT20 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry XT20 may be developed in accordance with a Joint Electron Devices Engineering Council (JEDEC) low power double data rate (LPDDR)-based design, such as LPDDR2, LPDDR3, LPDDR4, or the like. Memory circuitry XT20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry XT20 may be on-die memory or register associated with the application circuitry XT05. To provide for persistent storage of information such as data, applications, operating systems and so forth, memory circuitry XT20 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform XT00 may incorporate the three-dimensional (3D) cross-point (XPOINT) memories from Intel® and Micron®.

Removable memory circuitry XT23 may include devices, circuitry, enclosures/housings, ports or receptacles, etc. used to coupled portable data storage devices with the platform XT00 These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform XT00 may also include interface circuitry (not shown) that is used to connect external devices with the platform XT00. The external devices connected to the platform XT00 via the interface circuitry may include sensors XT21, such as accelerometers, level sensors, flow sensors, temperature sensors, pressure sensors, barometric pressure sensors, and the like. The interface circuitry may be used to connect the platform XT00 to electro-mechanical components (EMCs) XT22, which may allow platform XT00 to change its slate, position, and/or orientation, or move or control a mechanism or system. The EMCs XT22 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and or other like electro-mechanical components. In embodiments, platform XT00 may be configured to operate one or more EMCs XT22 based on one or more captured events and or instructions or control signals received from a service provider and/or various clients.

In some implementations, the interface circuitry may connect the platform XT00 with positioning circuitry XT45, which may be the same or similar as the positioning circuitry XS45 discussed with regard to FIG. 11.

In some implementations, the interface circuitry may connect the platform XT00 with near field communication (NFC) circuitry XT40, which may include an NFC controller coupled with an antenna element and a processing device. The NFC circuitry XT40 may be configured to read electronic tags and/or connect with another NFC-enabled device.

The driver circuitry XT46 may include software and hardware elements that operate to control particular devices that are embedded in the platform XT00, attached to the platform XT00, or otherwise communicatively coupled with the platform XT00. The driver circuitry XT46 may include individual drivers allowing other components of the platform XT00 to interact or control various input/output (I/O) deuces that may be present within, or connected to, the platform XT00. For example, driver circuitry XT46 may include a display driver to control and allow access to a display device, a touchscreen driver to control and allow access to a touchscreen interface of the platform XT00, sensor drivers to obtain sensor readings of sensors XT21 and control and allow access to sensors XT21, EMC drivers to obtain actuator positions of the EMCs XT22 and/or control and allow access to the EMCs XT22, a camera driver to control and allow access to an embedded image capture device, audio drivers to control and allow access to one or more audio devices.

The power management integrated circuitry (PMIC) XT25 (also referred to as "power management circuitry XT25") may manage power provided to various components of the platform XT00. In particular, with respect to the baseband circuitry XT10, the PMIC XT25 may control power-source selection, voltage scaling, battery charging, or DC-to-DC conversion. The PMIC XT25 may often be included when the platform XT00 is capable of being powered by a battery XT30, for example, when the device is included in a UE XQ01, XQ02, XR01.

In some embodiments, the PMIC XT25 may control, or otherwise be part of, various power saving mechanisms of the platform XT00. For example, if the platform XT00 is in an RRC_Connected state, where it is still connected to the RAN node as it expects to receive traffic shortly, then it may enter a state known as Discontinuous Reception Mode (DRX) after a period of inactivity. During this state, the platform XT00 may power down for brief intervals of time and thus save power. If there is no data traffic activity for an extended period of time, then the platform XT00 may transition off to an RRC_Idle state, where it disconnects from the network and does not perform operations such as channel quality-feedback, handover, etc. The platform XT00 goes into a very low power state and it performs paging where again it periodically wakes up to listen to the network and then powers down again. The platform XT00 may not receive data in this state, in order to receive data, it must transition back to RRC_Connected slate. An additional power saving mode may allow a device to be unavailable to the network for periods longer than a paging interval (ranging from seconds to a few hours). During this time, the device is totally unreachable to the network and may power down completely. Any data sent during tins time incurs a large delay and it is assumed the delay is acceptable.

A battery XT30 may power the platform XT00, although in some examples the platform XT00 may be mounted deployed in a fixed location, and may have a power supply-coupled to an electrical grid. The battery XT30 may be a lithium ion battery, a metal-air battery, such as a zinc-air battery, an aluminum-air battery, a lithium-air battery, and the like. In some implementations, such as in V2X applications, the batters XT30 may be a typical lead-acid automotive battery.

In some implementations, the battery XT30 may be a "smart battery," which includes or is coupled with a Battery Management System (BMS) or battery monitoring integrated circuitry. The BMS may be included in the platform XT00 to track the state of charge (SoCh) of the battery XT30. The BMS may be used to monitor other parameters of the battery XT30 to provide failure predictions, such as the state of health (SoH) and the state of function (SoF) of the battery XT30. The BMS may communicate the information of the battery XT30 to the application circuitry XT05 or other components of the platform XT00. The BMS may also include an analog-to-digital (ADC) convertor that allows the application circuitry XT05 to directly monitor the voltage of the battery XT30 or the current flow from the battery XT30. The battery parameters may be used to determine actions that the platform XT00 may perform, such as transmission frequency, network operation, sensing frequency, and the like.

A power block, or other power supply coupled to an electrical grid may be coupled with the BMS to charge the battery XT30. In some examples, the power block XQ28 may be replaced with a wireless power receiver to obtain the power wirelessly, for example, through a loop antenna in the computer platform XT00. In these examples, a wireless battery charging circuit may be included in the BMS. The specific charging circuits chosen may depend on the size of the battery XT30, and thus, the current required. The charging may be performed using the Airfuel standard promulgated by the Airfuel Alliance, the Qi wireless charging standard promulgated by the Wireless Power Consortium, or the Rezence charging standard-promulgated by the Alliance for Wireless Power, among others.

Although not shown, the components of platform XT00 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point-to-point interfaces, and a power bus, among others.

Figure 13:
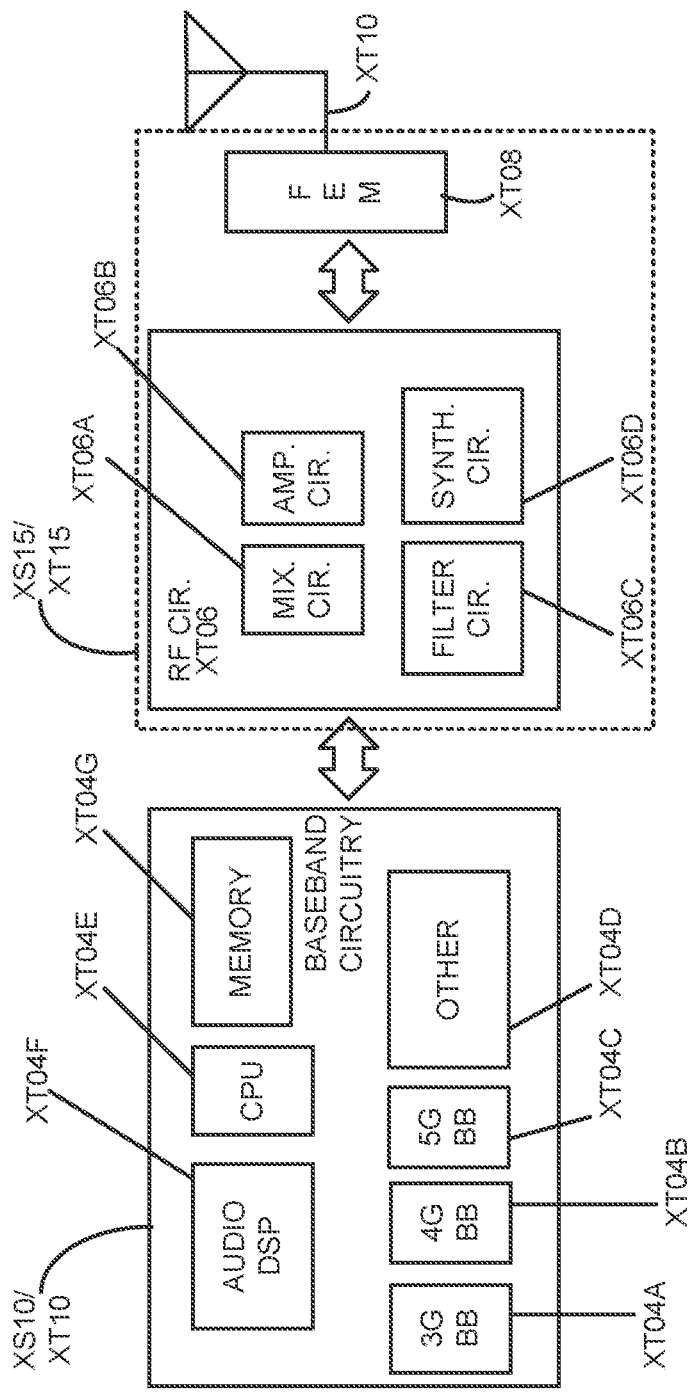
FIG. 13 illustrates example components of baseband circuitry and radio front end modules (RFEM), in accordance with various embodiments.

FIG. 13 illustrates example components of baseband circuitry XS10/XT10 and radio front end modules (RFEM) XS15/XT15 in accordance with some embodiments. As shown, the RFEM XS15/XT15 may include Radio Frequency (RF) circuitry XT06, front end module (FEM) circuitry XT08, one or more antennas XT10 coupled together at least as shown.

The baseband circuitry XS10/XT10 may include circuitry such as, but not limited to, one or more single-core or multi-core processors. The baseband circuitry XS10/XT10 may include one or more baseband processors or control logic to process baseband signals received from a receive signal path of the RF circuitry XT06 and to generate baseband signals for a transmit signal path of the RF circuitry XT06. Baseband processing circuitry XS10/XT10 may interface with the application circuitry XS05/XT05 for generation and processing of the baseband signals and for controlling operations of the RF circuitry XT06. For example, in some embodiments, the baseband circuitry XS10/XT10 may include a third generation (3G) baseband processor XT04A, a fourth generation (4G) baseband processor XT04B, a fifth generation (5G) baseband processor XT04C, or other baseband processors) XT04D for other existing generations, generations in development or to be developed in the future (e.g., second generation (2G), sixth generation (6G), etc.). The baseband circuitry XS10/XT10 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation demodulation, encoding/decoding, radio frequency shifting, etc. In some embodiments, modulation/demodulation circuitry of the baseband circuitry XS10/XT10 may include Fast-Fourier Transform (FFT), precoding, or constellation mapping/demapping functionality. In some embodiments, encoding/decoding circuitry of the baseband circuitry XS10/XT10 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XS10/XT10 may include one or more audio digital signal processors) (DSP) XT04F. The audio DSP(s) XT04F may be include elements for compression-decompression and echo cancellation and may include other suitable processing elements in other embodiments. Components of the baseband circuitry may be suitably combined in a single chip, a single chipset, or disposed on a same circuit board in some embodiments In some embodiments, some or all of the constituent components of the baseband circuitry XS10/XT10 and the application circuitry XS05/XT05 may be implemented together such as, for example, on a system on a chip (SoC).

In some embodiments, the baseband circuitry XS10/XT10 may provide for communication compatible with one or more radio technologies. For example, in some embodiments, the baseband circuitry XS10/XT10 may support communication with an evolved universal terrestrial radio access network (EUTRAN) or other wireless metropolitan area networks (WMAN), a wireless local area network (WLAN), a wireless personal area network (WPAN). Embodiments in winch the baseband circuitry XS10/XT10 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XS10/XT10. RF circuitry XT06 may also include a transmit signal path which may include circuitry to up-convert baseband signals provided by the baseband circuitry XS10/XT10 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT00b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XS10/XT10 for further processing. In some embodiments, the output baseband signals may be zero-frequency baseband signals, although this is not a requirement In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08.

The baseband signals may be provided by the baseband circuitry XS10/XT10 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XS10/XT10 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XS10/XT10 or the applications processor XS05/XT05 depending on the desired output frequency. In some embodiments, a divider control input (e.g., N) may be determined from a look-up table based on a channel indicated by the applications processor XS05/XT05.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the earner frequency (e.g., twice the carrier frequency, four times the carrier frequency) and used in conjunction with quadrature generator and divider circuitry to gave rate multiple signals at the carrier frequency with multiple different phases with respect to each other In some embodiments, the output frequency may be a LO frequency (fLO). In some embodiments, the RF circuitry XT00 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing FEM circuitry XT08 may also include a transmit signal path winch may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

Processors of the application circuitry XS05/XT05 and processors of the baseband circuitry XS10/XT10 may be used to execute elements of one or more instances of a protocol stack. For example, processors of the baseband circuitry XS10/XT10, alone or in combination, may be used execute Layer 3, Layer 2, or Layer 1 functionality, while processors of the baseband circuitry XS10/XT10 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
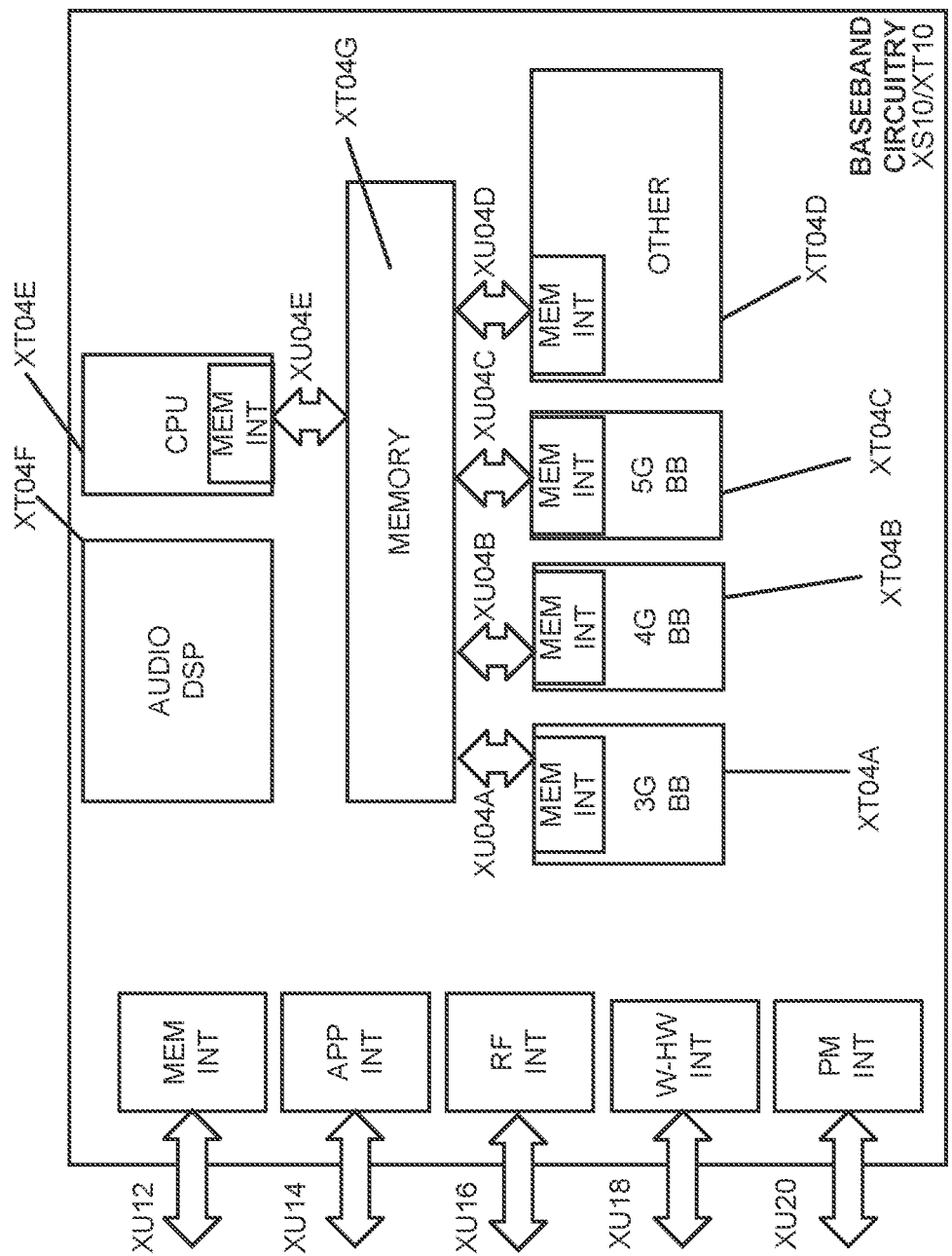
FIG. 14 illustrates example interfaces of baseband circuitry, in accordance with various embodiments.

FIG. 14 illustrates example interfaces of baseband circuitry in accordance with some embodiments. As discussed above, the baseband circuitry XS10/XT10 of FIGS. XS-XT1 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XS10/XT10 may further include one or more interfaces to communicatively couple to other circuitries/devices, such as a memory interface XU12 (e.g., an interface to send/receive data to/from memory external to the baseband circuitry XS10/XT10), an application circuitry interface XU14 (e.g., an interface to send/receive data to/from the application circuitry XS05/XT05 of FIGS. XS-XT1), an RF circuitry interface XU16 (e.g., an interface to send receive data to/from RF circuitry XT06 of FIG. XT2), a wireless hardware connectivity interface XU18 (e.g., an interface to send receive data to/from Near Field Communication (NFC) components, Bluetooth® components (e.g., Bluetooth® Low Energy). Wi-Fi® components, and other communication components), and a power management interface XU20 (e.g., an interface to send/receive power or control signals to/from the PMIC XT25.

Figure 15:
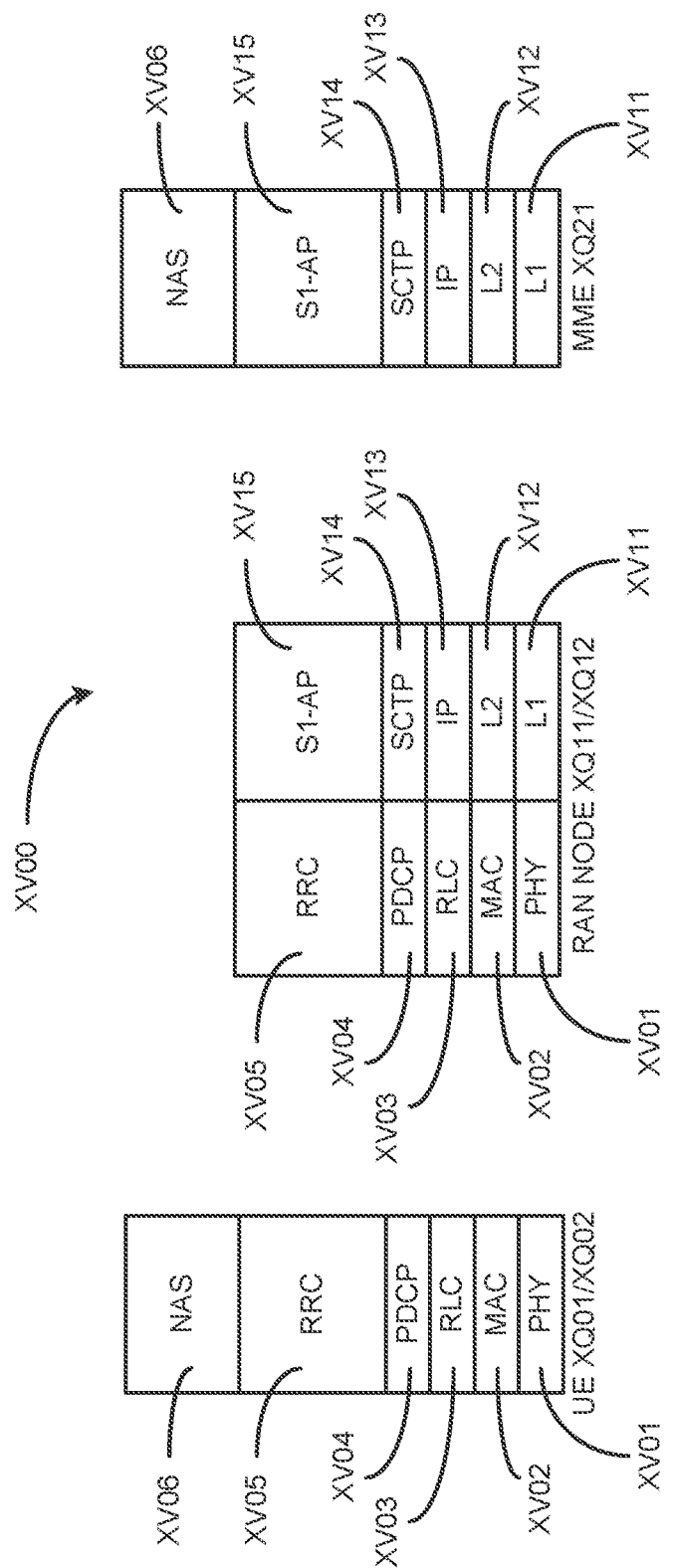
FIG. 15 is an illustration of a control plane protocol stack, in accordance with various embodiments.

FIG. 15 is an illustration of a control plane protocol stack in accordance with some embodiments. In this embodiment, a control plane XV00 is shown as a communications protocol stack between the UE XQ01 (or alternatively, the UE XQ02), the RAN node XQ11 (or alternatively, the RAN node XQ12), and the MME XQ21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding-decoding of die transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower lasers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging. RRC connection establishment, RRC connection modification, and RRC connection release), establishment, configuration, maintenance and release of point-to-point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XQ01 and the RAN node XQ11 may utilize a Uu interface (e.g., an LTE-Uu interface) to exchange control plane data via a protocol slack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XQ01 and the MME XQ21 The NAS protocols XV06 support the mobility of the UE XQ01 and the session management procedures to establish and maintain IP connectivity between the UE XQ01 and the P-GW XQ23.

The S1 Application Protocol (S1-AP) layer XV15 may support the functions of the S1 interface XQ13 and comprise Elementary Procedures (EPs). An EP is a unit of interaction between the RAN node XQ11 and the CN XQ20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XQ11 and the MME XQ21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XQ11 and the MME XQ21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 16:
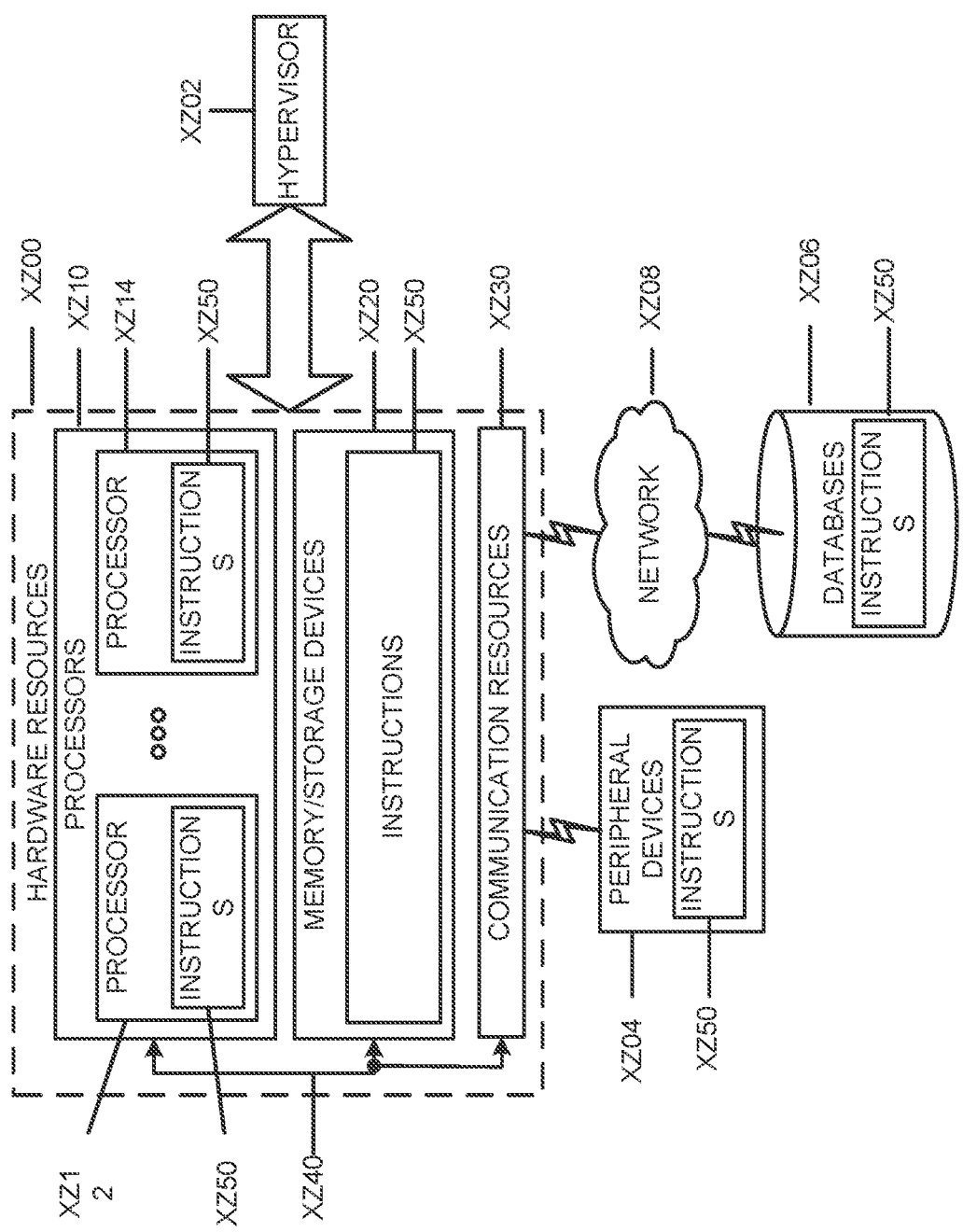
FIG. 16 is a block diagram illustrating components, according to some example embodiments, able to read instructions from a machine-readable or computer-readable medium (e.g., a non-transitory machine-readable storage medium) and perform any one or more of the techniques, processes, or methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. XZ shows a diagrammatic representation of hardware resources XZ00 including one or more processors (or processor cores) XZ10, one or more memory/storage devices XZ20, and one or more communication resources XZ30, each of which may be communicatively coupled via a bus XZ40. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor XZ02 may be executed to provide an execution environment for one or more network slices/sub-slices to utilize the hardware resources XZ00. A "virtualized resource" may refer to compute, storage, and/or network resources provided by virtualization infrastructure to an application, device, system, etc.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory-storage devices XZ20 may include, but are not limited to any type of volatile or non-volatile memory such as dynamic random access memory (DRAM), static random access memory (SRAM), erasable programmable read-only memory (EPROM), electrically erasable programmable read-only memory (EEPROM), Flash memory, solid state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wifi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include a method comprising: transmitting, by a base station in a first physical channel transmission, an indication of a first set of parameters related to a control channel; and transmitting, by the base station in a control channel transmission using the first set of parameters, an indication of a second set of parameters related to the control channel.

Example 2 may include the method of example 1, wherein the first physical channel transmission is a physical broadcast channel (PBCH) transmission.

Example 3 may include the method of example 2, wherein the PBCH transmission is a new radio (NR)-PBCH transmission.

Example 4 may include the method of example 1, wherein the control channel transmission is a physical downlink control channel (PDCCH) transmission.

Example 5 may include the method of example 4, wherein the PDCCH transmission is a new radio (NR)-PDCCH transmission.

Example 6 may include the method of example 4, wherein the control channel transmission relates to a physical downlink shared channel (PDSCH) transmission that includes a remaining minimum system information (RMSI) element.

Example 7 may include the method of any of examples 1-6, wherein the first set of parameters relate to a first set of timing parameters usable by a user equipment (UE) to monitor for the control channel transmission.

Example 8 may include the method of example 7, wherein the second set of parameters relate to a second set of timing information usable by a user equipment (UE) to monitor for a subsequent control channel transmission.

Example 9 may include the method of any of examples 1-6, wherein the first set of parameters are a first subset of control channel resource set (CORESET) parameters.

Example 10 may include the method of example 9, wherein the second set of parameters are a second subset of CORESET parameters that are different than the first subset of CORESET parameters.

Example 11 may include one or more computer-readable media comprising instructions that, upon execution by one or more processors of a base station, are to cause the base station to: transmit, in a first physical channel transmission, an indication of a first set of parameters related to a control channel; and transmit, by the base station in a control channel transmission using the first set of parameters, an indication of a second set of parameters related to the control channel.

Example 12 may include the one or more computer-readable media of example 11, wherein the first physical channel transmission is a physical broadcast channel (PBCH) transmission.

Example 13 may include the one or more computer-readable media of example 12, wherein the PBCH transmission is a new radio (NR)-PBCH transmission.

Example 14 may include the one or more computer-readable media of example 11, wherein the control channel transmission is a physical downlink control channel (PDCCH) transmission.

Example 15 may include the one or more computer-readable media of example 14, wherein the PDCCH transmission is a new radio (NR)-PDCCH transmission.

Example 16 may include the one or more computer-readable media of example 14, wherein the control channel transmission relates to a physical downlink shared channel (PDSCH) transmission that includes a remaining minimum system information (RMSI) element.

Example 17 may include the one or more computer-readable media of any of examples 11-17, wherein the first set of parameters relate to a first set of timing parameters usable by a user equipment (UE) to monitor for the control channel transmission.

Example 18 may include the one or more computer-readable media of example 17, wherein the second set of parameters relate to a second set of timing information usable by a user equipment (UE) to monitor for a subsequent control channel transmission.

Example 19 may include the one or more computer-readable media of any of examples 11-17, wherein the first set of parameters are a first subset of control channel resource set (CORESET) parameters.

Example 20 may include the one or more computer-readable media of example 19, wherein the second set of parameters are a second subset of CORESET parameters that are different than the first subset of CORESET parameters.

Example 21 may include a base station comprising: means to transmit, in a first physical channel transmission, an indication of a first set of parameters related to a control channel, and means to transmit, by the base station in a control channel transmission using the first set of parameters, an indication of a second set of parameters related to the control channel.

Example 22 may include the base station of example 21, wherein the first physical channel transmission is a physical broadcast channel (PBCH) transmission.

Example 23 may include the base station of example 22, wherein the PBCH transmission is a new radio (NR)-PBCH transmission.

Example 24 may include the base station of example 21, wherein the control channel transmission is a physical downlink control channel (PDCCH) transmission.

Example 25 may include the base station of example 24, wherein the PDCCH transmission is a new radio (NR)-PDCCH transmission.

Example 26 may include the base station of example 24, wherein the control channel transmission relates to a physical downlink shared channel (PDSCH) transmission that includes a remaining minimum system information (RMSI) element.

Example 27 may include the base station of any of examples 21-26, wherein the first set of parameters relate to a first set of timing parameters usable by a user equipment (UE) to monitor for the control channel transmission.

Example 28 may include the base station of example 27, wherein the second set of parameters relate to a second set of timing information usable by a user equipment (UE) to monitor for a subsequent control channel transmission.

Example 29 may include the base station of any of examples 21-26, wherein the first set of parameters are a first subset of control channel resource set (CORESET) parameters.

Example 30 may include the base station of example 29, wherein the second set of parameters are a second subset of CORESET parameters that are different than the first subset of CORESET parameters.

Example 31 may include a base station comprising, a processor, and one or more computer-readable media communicatively coupled with the processor, wherein the one or more computer-readable media include instructions that, upon execution of the instructions by the processor, are to cause the processor to: transmit, in a first physical channel transmission, an indication of a first set of parameters related to a control channel; and transmit, by the base station in a control channel transmission using the first set of parameters, an indication of a second set of parameters related to the control channel.

Example 32 may include the base station of example 31, wherein the first physical channel transmission is a physical broadcast channel (PBCH) transmission.

Example 33 may include the base station of example 32, wherein the PBCH transmission is a new radio (NR)-PBCH transmission.

Example 34 may include the base station of example 31, wherein the control channel transmission is a physical downlink control channel (PDCCH) transmission.

Example 35 may include the base station of example 34, wherein the PDCCH transmission is a new radio (NR)-PDCCH transmission.

Example 36 may include the base station of example 34, wherein the control channel transmission relates to a physical downlink shared channel (PDSCH) transmission that includes a remaining minimum system information (RMSI) element.

Example 37 may include the base station of any of examples 31-36, wherein the first set of parameters relate to a first set of timing parameters usable by a user equipment (UE) to monitor for the control channel transmission.

Example 38 may include the base station of example 37, wherein the second set of parameters relate to a second set of timing information usable by a user equipment (UE) to monitor for a subsequent control channel transmission.

Example 39 may include the base station of any of examples 31-36, wherein the first set of parameters are a first subset of control channel resource set (CORESET) parameters.

Example 40 may include the base station of example 39, wherein the second set of parameters are a second subset of CORESET parameters that are different than the first subset of CORESET parameters.

Example 41 may include a method comprising identifying, by a base station, a first parameter related to interleaving resource element group bundles (REGBs) of a physical downlink control channel (PDCCH) transmission, wherein the first parameter is selected from a first plurality of parameters: interleaving, by the base station, the REGBs based on the first parameter to form a control channel element (CCE), and transmitting, by the base station, the CCE in the PDCCH transmission.

Example 42 may include the method of example 41, wherein the REGBs are REGBs of a control channel resource set (CORESET) transmission.

Example 43 may include the method of examples 41 or 42, wherein the first parameter is related to a number of stages of an interleaver performing the interleaving of the REGBs.

Example 44 may include the method of example 43, further comprising: identifying, by the base station, a second parameter related to REGBs of the PDCCH transmission, wherein the second parameter is selected from a second plurality of parameters: and interleaving, by the base station, the REGBs based on the second parameter to form the CCE Example 45 may include the method of example 44, wherein the second parameter is related to a number of REGBs in the CCE for a stage of the interleaver.

Example 46 may include the method of example 44, wherein the second parameter is related to a number of rows of an interleaving matrix used by a stage of the interleaver.

Example 47 may include the method of example 44, wherein the second parameter is related to a number of columns of an interleaving matrix used by a stage of the interleaver.

Example 48 may include the method of example 44, wherein the second parameter is related to a column-permutation pattern vector of a stage of the interleaver.

Example 49 may include the method of example 48, wherein the column-permutation pattern vector is a function of a cell identifier (ID), a virtual cell identifier (VCID), or a user equipment identifier (UE ID).

Example 50 may include one or more computer-readable media comprising instructions that, upon execution of the instructions by one or more processors of a base station, are to cause the base station to: identify a first parameter related to interleaving resource element group bundles (REGBs) of a physical downlink control channel (PDCCH) transmission, wherein the first parameter is selected from a first plurality of parameters: interleave the REGBs based on the first parameter to form a control channel element (CCE); and transmit the CCE in the PDCCH transmission.

Example 51 may include the one or more computer-readable media of example 50, wherein the REGBs are REGBs of a control channel resource set (CORESET) transmission.

Example 52 may include the one or more computer-readable media of examples 50 or 51, wherein the first parameter is related to a number of stages of an interleaver performing the interleaving of the REGBs.

Example 53 may include the one or more computer-readable media of example 52, wherein the instructions are further to: identify a second parameter related to REGBs of the PDCCH transmission, wherein the second parameter is selected from a second plurality of parameters, and interleave the REGBs based on the second parameter to form the CCE.

Example 54 may include the one or more computer-readable media of example 53, wherein the second parameter is related to a number of REGBs in the CCE for a stage of the interleaver.

Example 55 may include the one or more computer-readable media of example 53, wherein the second parameter is related to a number of rows of an interleaving matrix used by a stage of the interleaver.

Example 56 may include the one or more computer-readable media of example 53, wherein the second parameter is related to a number of columns of an interleaving matrix used by a stage of the interleaver.

Example 57 may include the one or more computer-readable media of example 53, wherein the second parameter is related to a column-permutation pattern vector of a stage of the interleaver.

Example 58 may include the one or more computer-readable media of example 57, wherein the column-permutation pattern vector is a function of a cell identifier (ID), a virtual cell identifier (VCID), or a user equipment identifier (UE ID).

Example 59 may include a base station comprising: means to identify a first parameter related to interleaving resource element group bundles (REGBs) of a physical downlink control channel (PDCCH) transmission, wherein the first parameter is selected from a first plurality of parameters, means to interleave the REGBs based on the first parameter to form a control channel element (CCE): and means to transmit the CCE in the PDCCH transmission.

Example 60 may include the base station of example 59, wherein the REGBs are REGBs of a control channel resource set (CORESET) transmission.

Example 61 may include the base station of examples 59 or 60, wherein the first parameter is related to a number of stages of an interleaver performing the interleaving of the REGBs.

Example 62 may include the base station of example 61, further comprising: means to identify a second parameter related to REGBs of the PDCCH transmission, wherein the second parameter is selected from a second plurality of parameters; and means to interleave the REGBs based on the second parameter to form the CCE.

Example 63 may include the base station of example 62, wherein the second parameter is related to a number of REGBs in the CCE for a stage of the interleaver.

Example 64 may include the base station of example 62, wherein the second parameter is related to a number of rows of an interleaving matrix used by a stage of the interleaver.

Example 65 may include the base station of example 62, wherein the second parameter is related to a number of columns of an interleaving matrix used by a stage of the interleaver.

Example 66 may include the base station of example 62, wherein the second parameter is related to a column-permutation pattern vector of a stage of the interleaver.

Example 67 may include the base station of example 66, wherein the column-permutation pattern vector is a function of a cell identifier (ID), a virtual cell identifier (VCID), or a user equipment identifier (UE ID).

Example 68 may include a base station comprising: a processor; and one or more computer-readable media comprising instructions that, upon execution of the instructions by the processor, are to cause the base station to: identify a first parameter related to interleaving resource element group bundles (REGBs) of a physical downlink control channel (PDCCH) transmission, wherein the first parameter is selected from a first plurality of parameters; interleave the REGBs based on the first parameter to form a control channel element (CCE); and transmit the CCE in the PDCCH transmission.

Example 69 may include the base station of example 68, wherein the REGBs are REGBs of a control channel resource set (CORESET) transmission.

Example 70 may include the base station of examples 68 or 69, wherein the first parameter is related to a number of stages of an interleaver performing the interleaving of the REGBs.

Example 71 may include the base station of example 70, wherein the instructions are further to: identify a second parameter related to REGBs of the PDCCH transmission, wherein the second parameter is selected from a second plurality of parameters: and interleave the REGBs based on the second parameter to form the CCE.

Example 72 may include the base station of example 71, wherein the second parameter is related to a number of REGBs in the CCE for a stage of the interleaver.

Example 73 may include the base station of example 71, wherein the second parameter is related to a number of rows of an interleaving matrix used by a stage of the interleaver.

Example 74 may include the base station of example 71, wherein the second parameter is related to a number of columns of an interleaving matrix used by a stage of the interleaver.

Example 75 may include the base station of example 71, wherein the second parameter is related to a column-permutation pattern vector of a stage of the interleaver.

Example 76 may include the base station of example 75, wherein the column-permutation pattern vector is a function of a cell identifier (ID), a virtual cell identifier (VCID), or a user equipment identifier (UE ID).

Example 77 may include a method comprising: transmitting, by a base station in a physical broadcast channel (PBCH) transmission, an indication of a first set of parameters related to a physical downlink control channel (PDCCH) transmission; identifying, by the base station, a first parameter related to interleaving resource element group bundles (REGBs) of the PDCCH transmission, wherein the first parameter is selected from a first plurality of parameters, interleaving, by the base station, the REGBs based on the first parameter to form a control channel element (CCE); and transmitting, by the base station in accordance with the first set of parameters related to the PDCCH transmission, the CCE in the PDCCH transmission, wherein the CCE is related to an indication of a second set of parameters related to the PDCCH.

Example 78 may include the method of example 77, wherein the indication of the second set of parameters related to the PDCCH is a remaining minimum system information (RMSI) transmission.

Example 79 may include the method of example 77, wherein the PBCH transmission is a new radio (NR)-PBCH transmission.

Example 80 may include the method of example 77, wherein the PDCCH transmission is a new radio (NR)-PDCCH transmission.

Example 81 may include the method of example 77, wherein the first set of parameters relate to a first set of timing parameters usable by a user equipment (UE) to monitor for the PDCCH transmission.

Example 82 may include the method of example 81, wherein the second set of parameters relate to a second set of timing information usable by a user equipment (UE) to monitor for a subsequent PDCCH transmission.

Example 83 may include the method of example 77, wherein the first set of parameters are a first subset of control channel resource set (CORESET) parameters.

Example 84 may include the method of example 83, wherein the second set of parameters are a second subset of CORESET parameters that are different than the first subset of CORESET parameters.

Example 85 may include the method of example 77, wherein the REGBs are REGBs of a control channel resource set (CORESET) transmission.

Example 86 may include the method of any of examples 77-85, wherein the first parameter is related to a number of stages of an interleaver performing the interleaving of the REGBs.

Example 87 may include the method of example 86, further comprising: identifying, by the base station, a second parameter related to REGBs of the PDCCH transmission, wherein the second parameter is selected from a second plurality of parameters; and interleaving, by the base station, the REGBs based on the second parameter to form the CCE Example 88 may include the method of example 87, wherein the second parameter is related to a number of REGBs in the CCE for a stage of the interleaver.

Example 89 may include the method of example 87, wherein the second parameter is related to a number of rows of an interleaving matrix used by a stage of the interleaver.

Example 90 may include the method of example 87, wherein the second parameter is related to a number of columns of an interleaving matrix used by a stage of the interleaver.

Example 91 may include the method of example 87, wherein the second parameter is related to a column-permutation pattern vector of a stage of the interleaver.

Example 92 may include the method of example 91, wherein the column-permutation pattern vector is a function of a cell identifier (ID), a virtual cell identifier (VCID), or a user equipment identifier (UE ID).

Example 93 may include one or more computer-readable media comprising instructions that, upon execution of the instructions by one or more processors of a base station, are to cause the base station to: transmit, in a physical broadcast channel (PBCH) transmission, an indication of a first set of parameters related to a physical downlink control channel (PDCCH) transmission; identity a first parameter related to interleaving resource element group bundles (REGBs) of the PDCCH transmission, wherein the first parameter is selected from a first plurality of parameters, interleave the REGBs based on the first parameter to form a control channel element (CCE); and transmit, in accordance with the first set of parameters related to the PDCCH transmission, the CCE in the PDCCH transmission, wherein the CCE is related to an indication of a second set of parameters related to the PDCCH.

Example 94 may include the one or more computer-readable media of example 93, wherein the indication of the second set of parameters related to the PDCCH is a remaining minimum system information (RMSI) transmission.

Example 95 may include the one or more computer-readable media of example 93, wherein the PBCH transmission is a new radio (NR)-PBCH transmission.

Example 96 may include the one or more computer-readable media of example 93, wherein the PDCCH transmission is a new radio (NR)-PDCCH transmission.

Example 97 may include the one or more computer-readable media of example 93, wherein the first set of parameters relate to a first set of timing parameters usable by a user equipment (UE) to monitor for the PDCCH transmission.

Example 98 may include the one or more computer-readable media of example 97, wherein the second set of parameters relate to a second set of liming information usable by a user equipment (UE) to monitor for a subsequent PDCCH transmission.

Example 99 may include the one or more computer-readable media of example 93, wherein the first set of parameters are a first subset of control channel resource set (CORESET) parameters.

Example 100 may include the one or more computer-readable media of example 99, wherein the second set of parameters are a second subset of CORESET parameters that are different than the first subset of CORESET parameters.

Example 101 may include the one or more computer-readable media of example 93, wherein the REGBs are REGBs of a control channel resource set (CORESET) transmission.

Example 102 may include the one or more computer-readable media of any of examples 93-101, wherein the first parameter is related to a number of stages of an interleaver performing the interleaving of the REGBs.

Example 103 may include the one or more computer-readable media of example 102, wherein the instructions are further to: identity a second parameter related to REGBs of the PDCCH transmission, wherein the second parameter is selected from a second plurality of parameters; and interleave the REGBs based on the second parameter to form the CCE.

Example 104 may include the one or more computer-readable media of example 103, wherein the second parameter is related to a number of REGBs in the CCE for a stage of the interleaver.

Example 105 may include the one or more computer-readable media of example 103, wherein the second parameter is related to a number of rows of an interleaving matrix used by a stage of the interleaver.

Example 106 may include the one or more computer-readable media of example 103, wherein the second parameter is related to a number of columns of an interleaving matrix used by a stage of the interleaver.

Example 107 may include the one or more computer-readable media of example 103, wherein the second parameter is related to a column-permutation pattern vector of a stage of the interleaver.

Example 108 may include the one or more computer-readable media of example 107, wherein the column-permutation pattern vector is a function of a cell identifier (ID), a virtual cell identifier (VCID), or a user equipment identifier (UE ID).

Example 109 may include a base station comprising: means to transmit, in a physical broadcast channel (PBCH) transmission, an indication of a first set of parameters related to a physical downlink control channel (PDCCH) transmission: means to identify a first parameter related to interleaving resource element group bundles (REGBs) of the PDCCH transmission, wherein the first parameter is selected from a first plurality of parameters, means to interleave the REGBs based on the first parameter to form a control channel element (CCE); and means to transmit, in accordance with the first set of parameters related to the PDCCH transmission, the CCE in the PDCCH transmission, wherein the CCE is related to an indication of a second set of parameters related to the PDCCH.

Example 110 may include the base station of example 109, wherein the indication of the second set of parameters related to the PDCCH is a remaining minimum system information (RMSI) transmission.

Example 111 may include the base station of example 109, wherein the PBCH transmission is a new radio (NR)-PBCH transmission.

Example 112 may include the base station of example 109, wherein the PDCCH transmission is a new radio (NR)-PDCCH transmission.

Example 113 may include the base station of example 109, wherein the first set of parameters relate to a first set of timing parameters usable by a user equipment (UE) to monitor for the PDCCH transmission.

Example 114 may include the base station of example 113, wherein the second set of parameters relate to a second set of timing information usable by a user equipment (UE) to monitor for a subsequent PDCCH transmission.

Example 115 may include the base station of example 109, wherein the first set of parameters are a first subset of control channel resource set (CORESET) parameters.

Example 116 may include the base station of example 115, wherein the second set of parameters are a second subset of CORESET parameters that are different than the first subset of CORESET parameters.

Example 117 may include the base station of example 109, wherein the REGBs are REGBs of a control channel resource set (CORESET) transmission.

Example 118 may include the base station of any of examples 109-117, wherein the first parameter is related to a number of stages of an interleaver performing the interleaving of the REGBs.

Example 119 may include the base station of example 118, further comprising means to identify a second parameter related to REGBs of the PDCCH transmission, wherein the second parameter is selected from a second plurality of parameters, and means to interleaver the REGBs based on the second parameter to form the CCE.

Example 120 may include the base station of example 119, wherein the second parameter is related to a number of REGBs in the CCE for a stage of the interleaver.

Example 121 may include the base station of example 119, wherein the second parameter is related to a number of rows of an interleaving matrix used by a stage of the interleaver.

Example 122 may include the base station of example 119, wherein the second parameter is related to a number of columns of an interleaving matrix used by a stage of the interleaver.

Example 123 may include the base station of example 119, wherein the second parameter is related to a column-permutation pattern vector of a stage of the interleaver.

Example 124 may include the base station of example 123, wherein the column-permutation pattern vector is a function of a cell identifier (ID), a virtual cell identifier (VCID), or a user equipment identifier (UE ID).

Example 125 may include a base station comprising: a processor; and one or more computer-readable media comprising instructions that, upon execution of the instructions by the processor, are to cause the base station to: transmit, in a physical broadcast channel (PBCH) transmission, an indication of a first set of parameters related to a physical downlink control channel (PDCCH) transmission, identify a first parameter related to interleaving resource element group bundles (REGBs) of the PDCCH transmission, wherein the first parameter is selected from a first plurality of parameters; interleave the REGBs based on the first parameter to form a control channel element (CCE); and transmit, in accordance with die first set of parameters related to the PDCCH transmission, the CCE in the PDCCH transmission, wherein the CCE is related to an indication of a second set of parameters related to the PDCCH.

Example 126 may include the base station of example 125, wherein the indication of the second set of parameters related to the PDCCH is a remaining minimum system information (RMSI) transmission.

Example 127 may include the base station of example 125, wherein the PBCH transmission is a new radio (NR)-PBCH transmission.

Example 128 may include the base station of example 125, wherein the PDCCH transmission is a new radio (NR)-PDCCH transmission.

Example 129 may include the base station of example 125, wherein the first set of parameters relate to a first set of timing parameters usable by a user equipment (UE) to monitor for the PDCCH transmission.

Example 130 may include the base station of example 129, wherein the second set of parameters relate to a second set of timing information usable by a user equipment (UE) to monitor for a subsequent PDCCH transmission.

Example 131 may include the base station of example 125, wherein the first set of parameters are a first subset of control channel resource set (CORESET) parameters.

Example 132 may include the base station of example 131, wherein the second set of parameters are a second subset of CORESET parameters that are different than the first subset of CORESET parameters.

Example 133 may include the base station of example 125, wherein the REGBs are REGBs of a control channel resource set (CORESET) transmission.

Example 134 may include the base station of any of examples 125-133, wherein the first parameter is related to a number of stages of an interleaver performing the interleaving of the REGBs.

Example 135 may include the base station of example 134, wherein the instructions are further to: identify a second parameter related to REGBs of the PDCCH transmission, system the second parameter is selected from a second plurality of parameters; and interleave the REGBs based on the second parameter to form the CCE.

Example 136 may include the base station of example 135, wherein the second parameter is related to a number of REGBs in the CCE for a stage of the interleaver.

Example 137 may include the base station of example 135, wherein the second parameter is related to a number of rows of an interleaving matrix used by a stage of the interleaver.

Example 138 may include the base station of example 135, wherein the second parameter is related to a number of columns of an interleaving matrix used by a stage of the interleaver.

Example 139 may include the base station of example 135, wherein the second parameter is related to a column-permutation pattern vector of a stage of the interleaver.

Example 140 may include the base station of example 139, wherein the column-permutation pattern vector is a function of a cell identifier (ID), a virtual cell identifier (VCID), or a user equipment identifier (UE ID).

Example 141 may include a method comprising: identifying, by a user equipment (UE) in a received first physical channel transmission, an indication of a first set of parameters related to a control channel; and identifying, by the UE in a received control channel transmission that is based on the first set of parameters, an indication of a second set of parameters related to the control channel.

Example 142 may include the method of example 141, wherein the first physical channel transmission is a physical broadcast channel (PBCH) transmission.

Example 143 may include the method of example 142, wherein the PBCH transmission is a new radio (NR)-PBCH transmission.

Example 144 may include the method of example 141, wherein the control channel transmission is a physical downlink control channel (PDCCH) transmission.

Example 145 may include the method of example 144, wherein the PDCCH transmission is a new radio (NR)-PDCCH transmission.

Example 146 may include the method of example 144, wherein the control channel transmission relates to a physical downlink shared channel (PDSCH) transmission that includes a remaining minimum system information (RMSI) element.

Example 147 may include the method of any of examples 141-146, wherein the first set of parameters relate to a first set of timing parameters usable by the UE to monitor for the control channel transmission.

Example 148 may include the method of example 147, wherein the second set of parameters relate to a second set of timing information usable by the UE to monitor for a subsequent control channel transmission.

Example 149 may include the method of any of examples 141-146, wherein the first set of parameters are a first subset of control channel resource set (CORESET) parameters.

Example 150 may include the method of example 149, wherein the second set of parameters are a second subset of CORESET parameters that are different than the first subset of CORESET parameters.

Example 151 may include one or more computer-readable media comprising instructions that, upon execution by one or more processors of a user equipment (UE), are to cause the UE to: identify, in a received first physical channel transmission, an indication of a first set of parameters related to a control channel; and identity, in a received control channel transmission that is based on the first set of parameters, an indication of a second set of parameters related to the control channel.

Example 152 may include the one or more computer-readable media of example 151, wherein the first physical channel transmission is a physical broadcast channel (PBCH) transmission.

Example 153 may include the one or more computer-readable media of example 152, wherein the PBCH transmission is a new radio (NR)-PBCH transmission.

Example 154 may include the one or more computer-readable media of example 151, wherein the control channel transmission is a physical downlink control channel (PDCCH) transmission.

Example 155 may include the one or more computer-readable media of example 154, wherein the PDCCH transmission is a new radio (NR)-PDCCH transmission.

Example 156 may include the one or more computer-readable media of example 154, system the control channel transmission relates to a physical downlink shared channel (PDSCH) transmission that includes a remaining minimum system information (RMSI) element.

Example 157 may include the one or more computer-readable media of any of examples 151-156, wherein the first set of parameters relate to a first set of liming parameters usable by the UE to monitor for the control channel transmission.

Example 158 may include the one or more computer-readable media of example 157, wherein the second set of parameters relate to a second set of timing information usable by the UE to monitor for a subsequent control channel transmission.

Example 159 may include the one or more computer-readable media of any of examples 151-156, wherein the first set of parameters are a first subset of control channel resource set (CORESET) parameters.

Example 160 may include the one or more computer-readable media of example 159, wherein the second set of parameters are a second subset of CORESET parameters that are different than the first subset of CORESET parameters.

Example 161 may include a user equipment (UE) comprising, means to identify, in a received first physical channel transmission, an indication of a first set of parameters related to a control channel; and means to identify, in a received control channel transmission that is based on the first set of parameters, an indication of a second set of parameters related to the control channel.

Example 162 may include the UE of example 161, wherein the first physical channel transmission is a physical broadcast channel (PBCH) transmission.

Example 163 may include the UE of example 162, wherein the PBCH transmission is a new radio (NR)-PBCH transmission.

Example 164 may include the UE of example 161, wherein the control channel transmission is a physical downlink control channel (PDCCH) transmission.

Example 165 may include the UE of example 164, wherein the PDCCH transmission is a new radio (NR)-PDCCH transmission.

Example 166 may include the UE of example 164, wherein the control channel transmission relates to a physical downlink shared channel (PDSCH) transmission that includes a remaining minimum system information (RMSI) element.

Example 167 may include the UE of any of examples 161-166, wherein the first set of parameters relate to a first set of timing parameters usable by the UE to monitor for the control channel transmission.

Example 168 may include the UE of example 167, wherein the second set of parameters relate to a second set of timing information usable by the UE to monitor for a subsequent control channel transmission.

Example 169 may include the UE of any of examples 161-166, wherein the first set of parameters are a first subset of control channel resource set (CORESET) parameters.

Example 170 may include the UE of example 169, wherein the second set of parameters are a second subset of CORESET parameters that are different than the first subset of CORESET parameters.

Example 171 may include a user equipment (UE) comprising, a processor; and one or more computer-readable media comprising instructions that, upon execution by the process, are to cause the UE to: identify, in a received first physical channel transmission, an indication of a first set of parameters related to a control channel; and identify, in a received control channel transmission that is based on the first set of parameters, an indication of a second set of parameters related to the control channel.

Example 172 may include the UE of example 171, wherein the first physical channel transmission is a physical broadcast channel (PBCH) transmission.

Example 173 may include the UE of example 172, wherein the PBCH transmission is a new radio (NR)-PBCH transmission.

Example 174 may include the UE of example 171, wherein the control channel transmission is a physical downlink control channel (PDCCH) transmission.

Example 175 may include the UE of example 174, wherein the PDCCH transmission is a new radio (NR)-PDCCH transmission.

Example 176 may include the UE of example 174, wherein the control channel transmission relates to a physical downlink shared channel (PDSCH) transmission that includes a remaining minimum system information (RMSI) element.

Example 177 may include the UE of any of examples 171-176, wherein the first set of parameters relate to a first set of timing parameters usable by the UE to monitor for the control channel transmission.

Example 178 may include the UE of example 177, wherein the second set of parameters relate to a second set of timing information usable by the UE to monitor for a subsequent control channel transmission.

Example 179 may include the UE of any of examples 171-176, wherein the first set of parameters are a first subset of control channel resource set (CORESET) parameters.

Example 180 may include the UE of example 179, wherein the second set of parameters are a second subset of CORESET parameters that are different than the first subset of CORESET parameters.

Example 181 may include a method comprising: identifying, by a user equipment (UE), a physical downlink control channel (PDCCH) transmission received from a base station; and identifying, by the UE, a control channel element (CCE) in the PDCCH transmission; wherein the CCE is based on interleaving, by the base station, resource element group bundles (REGBs) of the PDCCH transmission based on a first parameter selected from a first plurality of parameters related to the REGBs.

Example 182 may include the method of example 181, wherein the REGBs are REGBs of a control channel resource set (CORESET) transmission.

Example 183 may include the method of examples 181-182, wherein the first parameter is related to a number of stages of an interleaver performing the interleaving of the REGBs.

Example 184 may include the method of example 183, wherein the CCE is further based on interleaving, by the base station, the REGBs based on a second parameter related to REGBs of the PDCCH transmission.

Example 185 may include the method of example 184, wherein the second parameter is related to a number of REGBs in the CCE for a stage of the interleaver.

Example 186 may include the method of example 184, wherein the second parameter is related to a number of rows of an interleaving matrix used by a stage of the interleaver.

Example 187 may include the method of example 184, wherein the second parameter is related to a number of columns of an interleaving matrix used by a stage of the interleaver.

Example 188 may include the method of example 184, wherein the second parameter is related to a column-permutation pattern vector of a stage of the interleaver.

Example 189 may include the method of example 188, wherein the column-permutation pattern vector is a function of a cell identifier (ID), a virtual cell identifier (VCID), or a user equipment identifier (UE ID).

Example 190 may include one or more computer-readable media comprising instructions that, upon execution of the instructions by one or more processors of a user equipment (UE), are to cause the UE to identify a physical downlink control channel (PDCCH) transmission received from a base station, and identify a control channel element (CCE) in the PDCCH transmission; wherein the CCE is based on interleaving, by the base station, resource element group bundles (REGBs) of the PDCCH transmission based on a first parameter selected from a first plurality of parameters related to the REGBs.

Example 191 may include the one or more computer-readable media of example 190, wherein the REGBs are REGBs of a control channel resource set (CORESET) transmission.

Example 192 may include the one or more computer-readable media of examples 190 or 191, wherein the first parameter is related to a number of stages of an interleaver performing the interleaving of the REGBs.

Example 193 may include the one or more computer-readable media of example 192, wherein the CCE is further based on interleaving, by the base station, the REGBs based on a second parameter related to REGBs of the PDCCH transmission.

Example 194 may include the one or more computer-readable media of example 193, wherein the second parameter is related to a number of REGBs in the CCE for a stage of the interleaver.

Example 195 may include the one or more computer-readable media of example 193, wherein the second parameter is related to a number of rows of an interleaving matrix used by a stage of the interleaver.

Example 196 may include the one or more computer-readable media of example 19.3, wherein the second parameter is related to a number of columns of an interleaving matrix used by a stage of the interleaver.

Example 197 may include the one or more computer-readable media of example 193, wherein the second parameter is related to a column-permutation pattern vector of a stage of the interleaver.

Example 198 may include the one or more computer-readable media of example 197, wherein the column-permutation pattern vector is a function of a cell identifier (ID), a virtual cell identifier (VCID), or a user equipment identifier (UE ID).

Example 199 may include a user equipment (UE) comprising: means to identify a physical downlink control channel (PDCCH) transmission received from a base station, and means to identify a control channel element (CCE) in the PDCCH transmission; wherein the CCE is based on interleaving, by the base station, resource element group bundles (REGBs) of the PDCCH transmission based on a first parameter selected from a first plurality of parameters related to the REGBs.

Example 200 may include the UE of example 199, wherein the REGBs are REGBs of a control channel resource set (CORESET) transmission.

Example 201 may include the UE of examples 199-200, wherein the first parameter is related to a number of stages of an interleaver performing the interleaving of the REGBs Example 202 may include the UE of example 201, wherein the CCE is further based on interleaving, by the base station, the REGBs based on a second parameter related to REGBs of the PDCCH transmission.

Example 203 may include the UE of example 202, wherein the second parameter is related to a number of REGBs in the CCE for a stage of the interleaver.

Example 204 may include the UE of example 202, wherein the second parameter is related to a number of rows of an interleaving matrix used by a stage of the interleaver.

Example 205 may include the UE of example 202, wherein the second parameter is related to a number of columns of an interleaving matrix used by a stage of the interleaver.

Example 206 may include the UE of example 202, wherein the second parameter is related to a column-permutation pattern vector of a stage of the interleaver.

Example 207 may include the UE of example 206, wherein the column-permutation pattern vector is a function of a cell identifier (ID), a virtual cell identifier (VCID), or a user equipment identifier (UE ID).

Example 208 may include a user equipment (UE) comprising: a processor; and one or more computer-readable media comprising instructions that, upon execution of the instructions by the processor, are to cause the UE to identify a physical downlink control channel (PDCCH) transmission received from a base station; and identify a control channel element (CCE) in the PDCCH transmission, wherein the CCE is based on interleaving, by the base station, resource element group bundles (REGBs) of the PDCCH transmission based on a first parameter selected from a first plurality of parameters related to the REGBs.

Example 209 may include the UE of example 208, wherein the REGBs are REGBs of a control channel resource set (CORESET) transmission.

Example 210 may include the UE of examples 208 or 209, wherein the first parameter is related to a number of stages of an interleaver performing the interleaving of the REGBs.

Example 211 may include the UE of example 210, wherein the CCE is further based on interleaving, by the base station, the REGBs based on a second parameter related to REGBs of the PDCCH transmission.

Example 212 may include the UE of example 211, wherein the second parameter is related to a number of REGBs in the CCE for a stage of the interleaver.

Example 213 may include the UE of example 211, wherein the second parameter is related to a number of rows of an interleaving matrix used by a stage of the interleaver.

Example 214 may include the UE of example 211, wherein the second parameter is related to a number of columns of an interleaving matrix used by a stage of the interleaver.

Example 215 may include the UE of example 211, wherein the second parameter is related to a column-permutation pattern vector of a stage of the interleaver.

Example 216 may include the UE of example 215, wherein the column-permutation pattern vector is a function of a cell identifier (ID), a virtual cell identifier (VCID), or a user equipment identifier (UE ID).

Example 217 may include a method comprising identifying, by a user equipment (UE) in a physical broadcast channel (PBCH) transmission received from a base station, an indication of a first set of parameters related to a physical downlink control channel (PDCCH) transmission; identifying, the PDCCH transmission received from the base station; and identifying, by the UE in accordance with the first set of parameters, a control channel element (CCE) in the PDCCH transmission, wherein the CCE is related to an indication of a second set of parameters related to the PDCCH; wherein the CCE is based on interleaving, by the base station, the REGBs based on a first parameter to form the CCE; and wherein the first parameter is related to interleaving resource element group bundles (REGBs) of the PDCCH transmission, and the first parameter is selected by the base station from a first plurality of parameters.

Example 218 may include the method of example 217, wherein the indication of the second set of parameters related to the PDCCH is a remaining minimum system information (RMSI) transmission.

Example 219 may include the method of example 217, wherein the PBCH transmission is a new radio (NR)-PBCH transmission.

Example 220 may include the method of example 217, wherein the PDCCH transmission is a new radio (NR)-PDCCH transmission.

Example 221 may include the method of example 217, wherein the first set of parameters relate to a first set of timing parameters usable by the UE to monitor for the PDCCH transmission.

Example 222 may include the method of example 221, wherein the second set of parameters relate to a second set of timing information usable by the UE to monitor for a subsequent PDCCH transmission.

Example 223 may include the method of example 217, wherein the first set of parameters are a first subset of control channel resource set (CORESET) parameters.

Example 224 may include the method of example 223, wherein the second set of parameters are a second subset of CORESET parameters that are different than the first subset of CORESET parameters.

Example 225 may include the method of example 217, wherein the REGBs are REGBs of a control channel resource set (CORESET) transmission.

Example 226 may include the method of any of examples 217-225, wherein the first parameter is related to a number of stages of an interleaver performing the interleaving of the REGBs.

Example 227 may include the method of example 226, wherein the CCE is further based on interleaving, by the base station, the REGBs based on a second parameter to form the CCE, the second parameter selected from a second plurality of parameters.

Example 228 may include the method of example 227, wherein the second parameter is related to a number of REGBs in the CCE for a stage of the interleaver.

Example 229 may include the method of example 227, wherein the second parameter is related to a number of rows of an interleaving matrix used by a stage of the interleaver.

Example 230 may include the method of example 227, wherein the second parameter is related to a number of columns of an interleaving matrix used by a stage of the interleaver.

Example 231 may include the method of example 227, wherein the second parameter is related to a column-permutation pattern vector of a stage of the interleaver.

Example 232 may include the method of example 231, wherein the column-permutation pattern vector is a function of a cell identifier (ID), a virtual cell identifier (VCID), or a UE ID.

Example 233 may include one or more computer-readable media comprising instructions that, upon execution of the instructions by one or more processors of a user equipment (UE), are to cause the UE to: identify, in a physical broadcast channel (PBCH) transmission received from a base station, an indication of a first set of parameters related to a physical downlink control channel (PDCCH) transmission; identify, the PDCCH transmission received from the base station, and identify, by the UE in accordance with the first set of parameters, a control channel element (CCE) in the PDCCH transmission, wherein the CCE is related to an indication of a second set of parameters related to the PDCCH; wherein the CCE is based on interleaving, by the base station, the REGBs based on a first parameter to form the CCE; and wherein the first parameter is related to interleaving resource element group bundles (REGBs) of the PDCCH transmission, and the first parameter is selected by the base station from a first plurality of parameters.

Example 234 may include the one or more computer-readable media of example 233, wherein the indication of the second set of parameters related to the PDCCH is a remaining minimum system information (RMSI) transmission.

Example 235 may include the one or more computer-readable media of example 233, wherein the PBCH transmission is a new radio (NR)-PBCH transmission.

Example 236 may include the one or more computer-readable media of example 233, wherein the PDCCH transmission is a new radio (NR)-PDCCH transmission.

Example 237 may include the one or more computer-readable media of example 233, wherein the first set of parameters relate to a first set of timing parameters usable by the UE to monitor for the PDCCH transmission.

Example 238 may include the one or more computer-readable media of example 237, wherein the second set of parameters relate to a second set of timing information usable by the UE to monitor for a subsequent PDCCH transmission.

Example 239 may include the one or more computer-readable media of example 233, wherein the first set of parameters are a first subset of control channel resource set (CORESET) parameters.

Example 240 may include the one or more computer-readable media of example 239, wherein the second set of parameters are a second subset of CORESET parameters that are different than the first subset of CORESET parameters.

Example 24 may include the one or more computer-readable media of example 233, wherein the REGBs are REGBs of a control channel resource set (CORESET) transmission.

Example 242 may include the one or more computer-readable media of any of examples 233-241, wherein the first parameter is related to a number of stages of an interleaver performing the interleaving of the REGBs.

Example 243 may include the one or more computer-readable media of example 242, wherein the CCE is further based on interleaving, by the base station, the REGBs based on a second parameter to form the CCE, the second parameter selected from a second plurality of parameters.

Example 244 may include the one or more computer-readable media of example 243, wherein the second parameter is related to a number of REGBs in the CCE for a stage of the interleaver.

Example 245 may include the one or more computer-readable media of example 243, wherein the second parameter is related to a number of rows of an interleaving matrix used by a stage of the interleaver.

Example 246 may include the one or more computer-readable media of example 243, wherein the second parameter is related to a number of columns of an interleaving matrix used by a stage of the interleaver.

Example 247 may include the one or more computer-readable media of example 243, wherein the second parameter is related to a column-permutation pattern vector of a stage of the interleaver.

Example 248 may include the one or more computer-readable media of example 247, wherein the column-permutation pattern vector is a function of a cell identifier (ID), a virtual cell identifier (VCID), or a UE ID.

Example 249 may include a user equipment (UE) comprising: means to identify, in a physical broadcast channel (PBCH) transmission received from a base station, an indication of a first set of parameters related to a physical downlink control channel (PDCCH) transmission; means to identify, the PDCCH transmission received from the base station; and means to identify, by the UE in accordance with the first set of parameters, a control channel element (CCE) in the PDCCH transmission, wherein the CCE is related to an indication of a second set of parameters related to the PDCCH; wherein the CCE is based on interleaving, by the base station, the REGBs based on a first parameter to form the CCE; and wherein the first parameter is related to interleaving resource element group bundles (REGBs) of the PDCCH transmission, and the first parameter is selected by the base station from a first plurality of parameters.

Example 250 may include the UE of example 249, wherein the indication of the second set of parameters related to the PDCCH is a remaining minimum system information (RMSI) transmission.

Example 251 may include the UE of example 249, wherein the PBCH transmission is a new radio (NR)-PBCH transmission.

Example 252 may include the UE of example 249, wherein the PDCCH transmission is a new radio (NR)-PDCCH transmission.

Example 253 may include the UE of example 249, wherein the first set of parameters relate to a first set of timing parameters usable by the UE to monitor for the PDCCH transmission.

Example 254 may include the UE of example 253, wherein the second set of parameters relate to a second set of timing information usable by the UE to monitor for a subsequent PDCCH transmission.

Example 255 may include the UE of example 249, wherein the first set of parameters are a first subset of control channel resource set (CORESET) parameters.

Example 256 may include the UE of example 255, wherein the second set of parameters are a second subset of CORESET parameters that are different than the first subset of CORESET parameters.

Example 257 may include the UE of example 249, wherein the REGBs are REGBs of a control channel resource set (CORESET) transmission.

Example 258 may include the UE of any of examples 249-257, wherein the first parameter is related to a number of stages of an interleaver performing the interleaving of the REGBs.

Example 259 may include the UE of example 258, wherein the CCE is further based on interleaving, by the base station, the REGBs based on a second parameter to form the CCE, the second parameter selected from a second plurality of parameters.

Example 260 may include the UE of example 259, wherein the second parameter is related to a number of REGBs in the CCE for a stage of the interleaver.

Example 261 may include the UE of example 259, wherein the second parameter is related to a number of rows of an interleaving matrix used by a stage of the interleaver.

Example 262 may include the UE of example 259, wherein the second parameter is related to a number of columns of an interleaving matrix used by a stage of the interleaver.

Example 263 may include the UE of example 259, wherein the second parameter is related to a column-permutation pattern vector of a stage of the interleaver.

Example 264 may include the UE of example 263, wherein the column-permutation pattern vector is a function of a cell identifier (ID), a virtual cell identifier (VCID), or a UE ID.

Example 265 may include a user equipment (UE) comprising: a processor, and one or more computer-readable media that include instructions that, upon execution of the instructions by the processor, are to cause the UE to: identify, in a physical broadcast channel (PBCH) transmission received from a base station, an indication of a first set of parameters related to a physical downlink control channel (PDCCH) transmission; identify, the PDCCH transmission received from the base station; and identity, by the UE in accordance with the first set of parameters, a control channel element (CCE) in the PDCCH transmission, wherein the CCE is related to an indication of a second set of parameters related to the PDCCH; wherein the CCE is based on interleaving, by the base station, the REGBs based on a first parameter to form the CCE; and wherein the first parameter is related to interleaving resource element group bundles (REGBs) of live PDCCH transmission, and the first parameter is selected by the base station from a first plurality of parameters.

Example 266 may include the UE of example 265, wherein the indication of the second set of parameters related to the PDCCH is a remaining minimum system information (RMSI) transmission.

Example 267 may include the UE of example 265, wherein the PBCH transmission is a new radio (NR)-PBCH transmission.

Example 268 may include the UE of example 265, wherein the PDCCH transmission is a new radio (NR)-PDCCH transmission.

Example 269 may include the UE of example 265, wherein the first set of parameters relate to a first set of timing parameters usable by the UE to monitor for the PDCCH transmission.

Example 270 may include the UE of example 269, wherein the second set of parameters relate to a second set of timing information usable by the UE to monitor for a subsequent PDCCH transmission.

Example 271 may include the UE of example 265, wherein the first set of parameters are a first subset of control channel resource set (CORESET) parameters.

Example 272 may include the UE of example 271, wherein the second set of parameters are a second subset of CORESET parameters that are different than the first subset of CORESET parameters.

Example 273 may include the UE of example 265, wherein the REGBs are REGBs of a control channel resource set (CORESET) transmission.

Example 274 may include the UE of any of examples 265-273, wherein the first parameter is related to a number of stages of an interleaver performing the interleaving of the REGBs.

Example 275 may include the UE of example 274, wherein the CCE is further based on interleaving, by the base station, the REGBs based on a second parameter to form the CCE, the second parameter selected from a second plurality of parameters.

Example 276 may include the UE of example 275, wherein the second parameter is related to a number of REGBs in the CCE for a stage of the interleaver.

Example 277 may include the UE of example 275, wherein the second parameter is related to a number of rows of an interleaving matrix used by a stage of the interleaver.

Example 278 may include the UE of example 275, wherein the second parameter is related to a number of columns of an interleaving matrix used by a stage of the interleaver.

Example 279 may include the UE of example 275, wherein the second parameter is related to a column-permutation pattern vector of a stage of the interleaver.

Example 280 may include the UE of example 279, wherein the column-permutation pattern vector is a function of a cell identifier (ID), a virtual cell identifier (VCID), or a UE ID.

Example 281 may include the fully configurable interleaver is comprised of one or several sequential interleaving stages. The number of interleaving stages, $N\_I$, is configurable.

Example 282 may include the subject matter of example 281 or some other example herein, wherein each configurable interleaving stage can involve three steps.

Example 283 may include, in step 1, a configurable rectangular interleaving matrix is written row-by-row in ascending column order.

Example 284 may include, in step 2, a configurable column-permutation operation is performed on the filled interleaving matrix.

Example 285 may include, in step 3, the interleaving matrix is read column-by-column in ascending row order.

Example 286 may include the following parameters can be configured in the nth interleaving stage, where $n=1, N\_I$.
    Interleaving unit in terms of the number of REGBs: $B\_n$
    The number of rows of interleaving matrix: $R\_n$
    The number of column of interleaving matrix: $C\_n$
    Column-permutation function: $c\_p = f_n(c)$, where $c = 1, 2, \ldots C_n$.

Example 287 may include some of the configurable parameters can be a function of other parameters.

Example 288 may include a network can configure a CORESET of X REGBs and each CCE contains Y REGBs. The interleaver can be configured with the following settings
    $NI=1$
    $B=1$
    $R=Y$
    $C=X/Y$
    $c\_p$ can be any deterministic function of cell- or virtual-ID and/or UE ID or other parameters.

Example 289 may include the resulted CCE from example 8 is fully distributed over the CORESET.

Example 290 may include the CCEs with consecutive indices can be also evenly distributed over the CORESET so that high aggregation level PDCCH including several consecutive CCEs in hierarchical search space is also evenly distributed over the whole CORESET.

Example 291 may include the interleaver can be also configured with the following settings
NI=1
B=1
R can be larger than Y
C=X/R Example 292 may include the generated CCE from example 291 only spans in a part of the CORESET, and more CCEs with consecutive indices can be distributed in the whole CORESET.

Example 293 may include the interleaver can be also configured with the following settings
NI=1
B=1
R can be smaller than Y
C=X/R Example 294 may include the resulted CCE from example 293 is spanned in several segment of consecutive REGBs. This further reduced distributed CCE allocation can potentially reduce the blocking probability of multiple overlapped CORESET configurations.

In Example 295, the network can choose the preferred interleaving setting according to the intended design targets and system control resource configuration.

Example 296 may include a method of wireless communication for a fifth generation (5G) or new radio (NR) system, the method comprising, configuring the control resource sets that the UE has to monitor control channels.

Example 297 may include the method of example 296 and/or some other examples herein, wherein, the control resource set is configured using two steps.

Example 298 may include the method of example 297 and/or some other examples herein, wherein the first step is done by broadcast channel and it includes a part of total configuration information.

Example 299 may include the method of example 297 and/or some other examples herein, wherein the second step is done by common data channel and it includes all or a part of total configuration information.

Example 300 may include the method of example 298 and/or some other examples herein, wherein the configuration by the first step should be sufficient that the UE is able to receive control channel using the configured CORESET before the second step is completed.

Example 301 may include the method of example 300 and/or some other examples herein, wherein the CORESET configuration parameter which is not configured in the first step has default mode that the UE assumes for the reception of control channel in CORESET before the second step.

Example 302 may include a method of wireless communication for a fifth generation (5G) or new radio (NR) system, the method comprising: configuring the numerology of CORESET for random access procedure.

Example 303 may include the method of example 302 and/or some other examples herein, wherein, the control resource set is configured using more than two steps and each step w ill include all or some of CORESET configuration information.

Example 304 may include the method of example 303 and/or some other examples herein, wherein the numerology of CORESET is mapped to the numerology of random access channel which is configured by broadcast channel.

Example 305 may include some combination of one or more of the above examples.

Example 306 may include an apparatus comprising means to perform one or more elements of a method described in or related to any of examples 1-305, or any other method or process described herein.

Example 307 may include one or more computer-readable media comprising instructions to cause an electronic device, upon execution of the instructions by one or more processors of the electronic device, to perform one or more elements of a method described in or related to any of examples 1-305, or any other method or process described herein.

Example 308 may include an apparatus comprising logic, modules, or circuitry to perform one or more elements of a method described in or related to any of examples 1-16, or any other method or process described herein.

Example 309 may include a method, technique, or process as described in or related to any of examples 1-16, or portions or parts thereof.

Example 310 may include an apparatus comprising: one or more processors and one or more computer-readable media comprising instructions that, when executed by the one or more processors, cause the one or more processors to perform the method, techniques, or process as described in or related to any of examples 1-16, or portions thereof.

Example 311 may include a signal as described in or related to any of examples 1-16, or portions or parts thereof.

Example 312 may include a signal in a wireless network as shown and described herein.

Example 313 may include a method of communicating in a wireless network as shown and described herein.

Example 314 may include a system for providing wireless communication as shown and described herein.

Example 315 may include a device for providing wireless communication as shown and described herein.

Various embodiments may include any suitable combination of the above-described embodiments including alternative for) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

What is claimed is:

1. A base station, comprising:
one or more computer-readable media; and
one or more processors, configured execute instructions stored on the one or more computer-readable media, to cause the processor to:
transmit, via a physical broadcast channel (PBCH) transmission, an indicator that indicates an entry of a table comprising a first set of parameters of a control resource set (CORESET) corresponding to a physical downlink control channel (PDCCH), the first set of parameters including a CORESET size in frequency, a frequency position of the CORESET, and a number of orthogonal frequency division multiplexing (OFDM) symbols of the CORESET; and
transmit, in a transmission of the PDCCH and based on the first set of parameters, scheduling information of a physical downlink shared channel (PDSCH) including remaining system information (RMSI),
wherein the CORESET is comprised of control channel element (CCEs),
wherein the indicator is configured to cause a user equipment (UE) to identify the entry of the table comprising a plurality of entries, each entry, of the plurality of entries of the table, comprising a different first set of CORESET parameters corresponding to the PDCCH, the first set of each parameters including CORES ET size in frequency, frequency position of the CORESET, and number of OFDM symbols of the CORESET.

2. The base station of claim 1, wherein the first set of parameters comprises:
a number of resource blocks; and
a frequency offset between a synchronization signal block and the CORESET.

3. The base station of claim 1, wherein the first set of parameters comprises:
a slot offset; and
periodicity of the CORESET.

4. The base station of claim 1, wherein the PBCH comprises:
an indication of a second set of parameters of a common search space for the CORESET.

5. The base station of claim 4, wherein the second set of parameters comprises information for monitoring of the PDCCH in the CORESET.

6. The base station of claim 1, wherein the PBCH further includes subcarrier spacing for the RMSI.

7. The base station of claim 1, wherein the RMSI comprises information of resources for receiving PDCCHs related to at least one of:
other system information;
paging; or
random access.

8. The base station of claim 1, wherein:
a CCE is comprised of 6 resource element groups (REGs) each containing 12 consecutive subcarriers,
the CORESET includes a CCE-to-REG mapping, the CCE-to-REG mapping being interleaved, and
an interleaver for the CCE-to-REG mapping being defined by:
writing inputs into an interleaving matrix in a first manner, the interleaving matrix including a plurality of columns,
re-arranging the plurality of columns of the interleaving matrix, the re-arranging being based on a cell ID of the base station, and
reading outputs in a second manner.

9. The base station of claim 1, wherein the base station indicates a second set of parameters, relating to timing information, to enable the UE to monitor a subsequent control channel transmission for non-essential CORESET information.

10. A method, comprising:
transmitting, via a physical broadcast channel (PBCH) transmission, an indicator that indicates an entry of a table comprising a first set of parameters of a control resource set (CORESET) corresponding to a physical downlink control channel (PDCCH), the first set of parameters including a CORESET size in frequency, a frequency position of the CORESET, and a number of orthogonal frequency division multiplexing (OFDM) symbols of the CORESET; and
transmitting, in a transmission of the PDCCH and based on the first set of parameters, scheduling information of a physical downlink shared channel (PDSCH) including remaining system information (RMSI),
wherein the CORESET is comprised of control channel element (CCEs),
wherein the indicator is configured to cause a user equipment (UE) to identify the entry of the table comprising a plurality of entries, each entry, of the plurality of entries of the table, comprising a different first set of CORESET parameters corresponding to the PDCCH, the first set of each parameters including CORESET size in frequency, frequency position of the CORESET, and number of OFDM symbols of the CORESET.

11. The method of claim 10, wherein the first set of parameters comprises:
a number of resource blocks; and
a frequency offset between a synchronization signal block and the CORESET.

12. The method of claim 10, wherein the first set of parameters comprises:
a slot offset; and
periodicity of the CORESET.

13. The method of claim 10, wherein the PBCH comprises:
an indication of a second set of parameters of a common search space for the CORESET.

14. The method of claim 13, wherein the second set of parameters comprises information for monitoring of the PDCCH in the CORESET.

15. The method of claim 10, wherein the PBCH further includes subcarrier spacing for the RMSI.

16. The method of claim 10, wherein the RMSI comprises information of resources for receiving PDCCHs related to at least one of:
other system information;
paging; or
random access.

17. The method of claim 10, wherein:
a CCE is comprised of 6 resource element groups (REGs) each containing 12 consecutive subcarriers,
the CORESET includes a CCE-to-REG mapping, the CCE-to-REG mapping being interleaved, and
an interleaver for the CCE-to-REG mapping being defined by:
writing inputs into an interleaving matrix in a first manner, the interleaving matrix including a plurality of columns,
re-arranging the plurality of columns of the interleaving matrix, the re-arranging being based on a cell ID of the base station, and reading outputs in a second manner.

18. A processor of a base station, the processor configured to perform instructions comprising:
transmit, via a physical broadcast channel (PBCH) transmission, an indicator that indicates of an entry of a table comprising a first set of parameters of a control resource set (CORESET) corresponding to a physical downlink control channel (PDCCH), the first set of parameters including a CORESET size in frequency, a frequency position of the CORESET, and a number of orthogonal frequency division multiplexing (OFDM) symbols of the CORESET; and
transmit, in a transmission of the PDCCH and based on the first set of parameters, scheduling information of a physical downlink shared channel (PDSCH) including remaining system information (RMSI),
wherein the CORESET is comprised of control channel element (CCEs),
wherein the indicator is configured to cause a user equipment (UE) to identify the entry of the table comprising a plurality of entries, each entry, of the plurality of entries of the table, comprising a different first set of CORESET parameters corresponding to the PDCCH, the first set of each parameters including CORESET size in frequency, frequency position of the CORESET, and number of OFDM symbols of the CORESET.

19. The processor of claim 18, wherein the first set of parameters comprises:
a number of resource blocks; and
a frequency offset between a synchronization signal block and the CORESET.

20. The processor of claim 18, wherein the first set of parameters comprises:
a slot offset; and
periodicity of the CORESET.

21. The processor of claim 18, wherein the PBCH comprises:
an indication of a second set of parameters of a common search space for the CORESET.

22. The processor of claim 21, wherein the second set of parameters comprises information for monitoring of the PDCCH in the CORESET.

23. The processor of claim 18, wherein the PBCH further includes subcarrier spacing for the RMSI.

24. The processor of claim 18, wherein the RMSI comprises information of resources for receiving PDCCHs related to at least one of:
other system information;
paging; or random access.

25. The processor of claim 18, wherein:
a CCE is comprised of 6 resource element groups (REGs) each containing 12 consecutive subcarriers,
the CORESET includes a CCE-to-REG mapping, the CCE-to-REG mapping being interleaved, and
an interleaver for the CCE-to-REG mapping being defined by:
writing inputs into an interleaving matrix in a first manner, the interleaving matrix including a plurality of columns,
re-arranging the plurality of columns of the interleaving matrix, the re-arranging being based on a cell ID of the base station, and
reading outputs in a second manner.

26. A baseband processor of a User Equipment (UE), comprising:
one or more processors configured to:
receive, via a physical broadcast channel (PBCH) transmission, an indicator that indicates an entry of a table comprising a first set of parameters of a control resource set (CORESET) corresponding to a physical downlink control channel (PDCCH), the first set of parameters including a CORESET size in frequency, a frequency position of the CORESET, and a number of orthogonal frequency division multiplexing (OFDM) symbols of the CORESET; and
receive, in a transmission of the PDCCH and based on the first set of parameters, scheduling information of a physical downlink shared channel (PDSCH) including remaining system information (RMSI),
wherein the CORESET is comprised of control channel element (CCEs),
wherein the indicator is configured to cause the UE to identify the entry of the table comprising a plurality of entries, each entry, of the plurality of entries of the table, comprising a different first set of CORESET parameters corresponding to the PDCCH, the first set of each parameters including CORESET size in frequency, frequency position of the CORESET, and number of OFDM symbols of the CORESET.

27. The baseband processor of claim 26, wherein the first set of parameters comprises:
a number of resource blocks; and
a frequency offset between a synchronization signal block and the CORESET.

28. The baseband processor of claim 26, wherein the first set of parameters comprises:
a slot offset; and
periodicity of the CORESET.

29. The baseband processor of claim 26, wherein the PBCH comprises:
an indication of a second set of parameters of a common search space for the CORESET.

30. The baseband processor of claim 29, wherein the second set of parameters comprises information for monitoring of the PDCCH in the CORESET.

31. The baseband processor of claim 26, wherein the PBCH further includes subcarrier spacing for the RMSI.

32. The baseband processor of claim 26, wherein the RMSI comprises information of resources for receiving PDCCHs related to at least one of:
other system information;
paging; or
random access.

33. The baseband processor of claim 26, wherein:
a CCE is comprised of 6 resource element groups (REGs) each containing 12 consecutive subcarriers,
the CORESET includes a CCE-to-REG mapping, the CCE-to-REG mapping being interleaved, and
an interleaver for the CCE-to-REG mapping being defined by:
writing inputs into an interleaving matrix in a first manner, the interleaving matrix including a plurality of columns,
re-arranging the plurality of columns of the interleaving matrix, the re-arranging being based on a cell ID of the base station, and
reading outputs in a second manner.

34. A User Equipment (UE), comprising:
one or more computer-readable media; and
one or more processors, configured execute instructions stored on the one or more computer- readable media, to cause the processor to:

receive, via a physical broadcast channel (PBCH) transmission, an indicator that indicates an entry of a table comprising a first set of parameters of a control resource set (CORESET) corresponding to a physical downlink control channel (PDCCH), the first set of parameters including a CORESET size in frequency, a frequency position of the CORESET, and a number of orthogonal frequency division multiplexing (OFDM) symbols of the CORESET; and receive, in a transmission of the PDCCH and based on the first set of parameters, scheduling information of a physical downlink shared channel (PDSCH) including remaining system information (RMSI), wherein the CORESET is comprised of control channel element (CCEs), wherein the indicator is configured to cause the UE to identify the entry of the table comprising a plurality of entries, each entry, of the plurality of entries of the table, comprising a different first set of CORESET parameters corresponding to the PDCCH, the first set of each parameters including CORESET size in frequency, frequency position of the CORESET, and number of OFDM symbols of the CORESET.

35. The UE of claim 34, wherein the first set of parameters comprises:
   a number of resource blocks; and
   a frequency offset between a synchronization signal block and the CORESET.

36. The UE of claim 34, wherein the first set of parameters comprises:
   a slot offset; and
   periodicity of the CORESET.

37. The UE of claim 34, wherein the PBCH comprises:
   an indication of a second set of parameters of a common search space for the CORESET.

38. The UE of claim 34, wherein:
   a CCE is comprised of 6 resource element groups (REGs) each containing 12 consecutive subcarriers,
   the CORESET includes a CCE-to-REG mapping, the CCE-to-REG mapping being interleaved, and
   an interleaver for the CCE-to-REG mapping being defined by:
      writing inputs into an interleaving matrix in a first manner, the interleaving matrix including a plurality of columns,
      re-arranging the plurality of columns of the interleaving matrix, the re-arranging being based on a cell ID of the base station, and
      reading outputs in a second manner.

39. A method performed by a User Equipment (UE), comprising:

receiving, via a physical broadcast channel (PBCH) transmission, an indicator that indicates an entry of a table comprising a first set of parameters of a control resource set (CORESET) corresponding to a physical downlink control channel (PDCCH), the first set of parameters including a CORESET size in frequency, a frequency position of the CORESET, and a number of orthogonal frequency division multiplexing (OFDM) symbols of the CORESET; and receiving, in a transmission of the PDCCH and based on the first set of parameters, scheduling information of a physical downlink shared channel (PDSCH) including remaining system information (RMSI), wherein the CORESET is comprised of control channel element (CCEs), wherein the indicator is configured to cause the UE to identify the entry of the table comprising a plurality of entries, each entry, of the plurality of entries of the table, comprising a different first set of CORESET parameters corresponding to the PDCCH, the first set of each parameters including CORESET size in frequency, frequency position of the CORESET, and number of OFDM symbols of the CORES ET.

40. The method of claim 39, wherein the first set of parameters comprises:
   a number of resource blocks; and
   a frequency offset between a synchronization signal block and the CORESET.

41. The method of claim 39, wherein the first set of parameters comprises:
   a slot offset; and
   periodicity of the CORESET.

42. The method of claim 39, wherein the PBCH comprises:
   an indication of a second set of parameters of a common search space for the CORESET.

43. The method of claim 39, wherein:
   a CCE is comprised of 6 resource element groups (REGs) each containing 12 consecutive subcarriers,
   the CORESET includes a CCE-to-REG mapping, the CCE-to-REG mapping being interleaved, and
   an interleaver for the CCE-to-REG mapping being defined by:
      writing inputs into an interleaving matrix in a first manner, the interleaving matrix including a plurality of columns,
      re-arranging the plurality of columns of the interleaving matrix, the re-arranging being based on a cell ID of the base station, and
      reading outputs in a second manner.

* * * * *